US006676089B1

(12) United States Patent
Katzer

(10) Patent No.: US 6,676,089 B1
(45) Date of Patent: *Jan. 13, 2004

(54) MODEL TRAIN CONTROL SYSTEM

(76) Inventor: Matthew A. Katzer, 1416 NW. Benfield Dr., Portland, OR (US) 97229

( * ) Notice: Subject to any disclaimer, the term of this patent is extended or adjusted under 35 U.S.C. 154(b) by 0 days.

This patent is subject to a terminal disclaimer.

(21) Appl. No.: 09/311,936

(22) Filed: May 14, 1999

Related U.S. Application Data

(63) Continuation of application No. 09/104,416, filed on Jun. 25, 1998, now Pat. No. 6,065,406.

(51) Int. Cl.[7] .................................................. G05D 1/00
(52) U.S. Cl. ........................ 246/1 R; 201/19; 340/146.2
(58) Field of Search ............................. 246/1 R, 167 R, 246/3, 5, 187 A; 201/19; 340/146.2, 500, 540, 825, 825.01, 825.03, 825.06, 825.07, 825.22, 825.52, 286.01, 286.02; 701/19, 20

(56) References Cited

U.S. PATENT DOCUMENTS 4,307,302 A 12/1981 Russell
4,853,883 A 8/1989 Nickles et al. .............. 364/578
5,475,818 A 12/1995 Molyneaux et al. ... 395/200.05
5,493,642 A 2/1996 Dunsmuir et al.
5,681,015 A 10/1997 Kull ........................... 246/187
5,787,371 A 7/1998 Balukin et al. ............... 701/19
5,896,017 A 4/1999 Severson et al.
5,940,005 A 8/1999 Severson et al.
5,952,797 A 9/1999 Rossler
6,065,406 A * 5/2000 Katzer ........................ 105/1.4
6,267,061 B1 * 7/2001 Katzer ........................ 105/1.4
6,270,040 B1 * 8/2001 Katzer ......................... 201/19

OTHER PUBLICATIONS

Chappell, Understanding Active X and OLE, 1996, pp. 1–329, published by Microsoft Press.

* cited by examiner

*Primary Examiner*—William A. Cuchlinski, Jr.
*Assistant Examiner*—Olga Hernandez
(74) *Attorney, Agent, or Firm*—Chernoff Vilhauer McClung & Stenzel, LLP

(57) ABSTRACT

A system which operates a digitally controlled model railroad transmitting a first command from a first client program to a resident external controlling interface through a first communications transport. A second command is transmitted from a second client program to the resident external controlling interface through a second communications transport. The first command and the second command are received by the resident external controlling interface which queues the first and second commands. The resident external controlling interface sends third and fourth commands representative of the first and second commands, respectively, to a digital command station for execution on the digitally controlled model railroad.

47 Claims, 12 Drawing Sheets

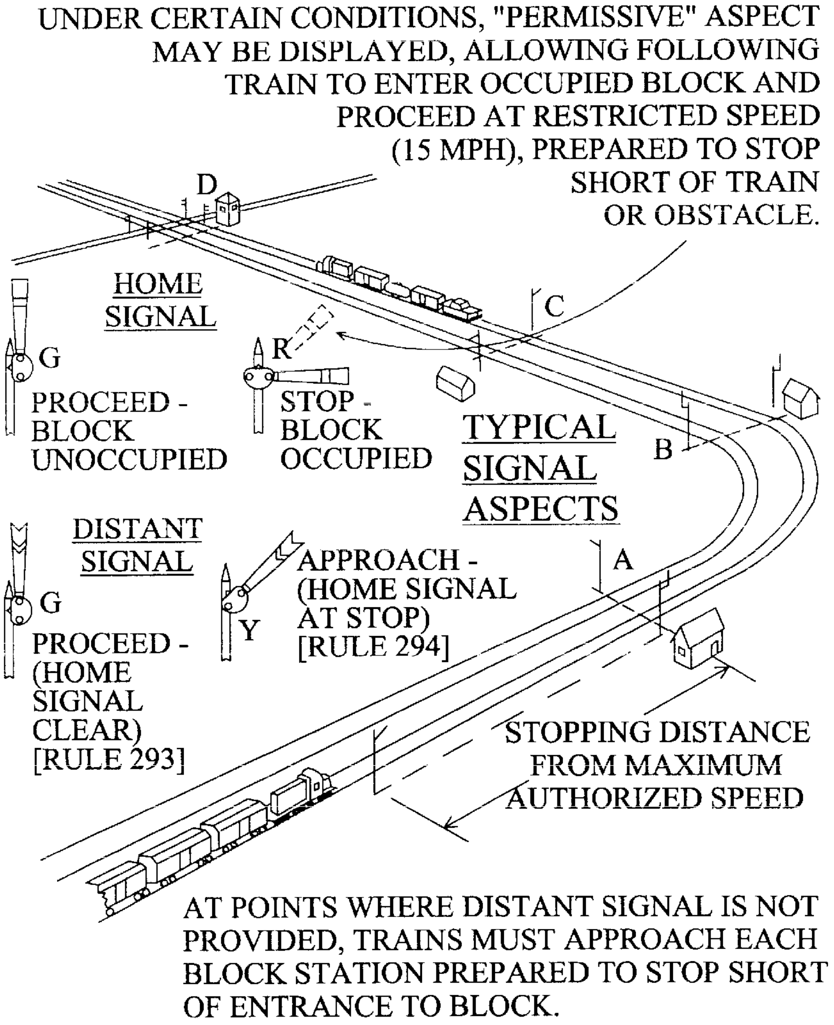

BLOCK STATION D

INTERLOCKING TOWER CONTROLLING RAILROAD CROSSING AT GRADE. ALSO SERVES AS BLOCK STATION.

BLOCK STATION C

BLOCK SIGNAL PUT AT STOP WHEN TRAIN PASSES SIGNAL AND ENTERS BLOCK - MUST REMAIN AT STOP UNTIL TRAIN HAS LEFT BLOCK AND OPERATOR AT D HAS SO ADVISED C.

BLOCK STATION B

CLOSED-SIGNAL LEFT AT "PROCEED" - BLOCK NOW EXTENDS FROM A TO C (STATION OPEN DURING PERIODS OF HEAVY TRAFFIC TO EXPEDITE TRAIN MOVEMENTS)

HOME SIGNAL - BLOCK STATION A

CLEARED UPON APPROACH OF TRAIN AFTER RECEIVING MESSAGE FROM OPERATOR AT C THAT PRECEDING TRAIN HAS LEFT BLOCK.

FIG. 5

BLOCK SIGNAL PRACTICE - EXAMPLE

| NAME | ASPECT | INDICATION |
|---|---|---|
| STOP | R (MARKER PLATE) | STOP AND PROCEED |
| APPROACH | Y | PROCEED PREPARED TO STOP AT NEXT SIGNAL * |
| APPROACH MEDIUM | Y Y | PROCEED PREPARED TO STOP AT SECOND SIGNAL * |
| ADVANCE APPROACH | Y G | PROCEED PREPARED TO STOP AT THIRD SIGNAL † |
| CLEAR | G | PROCEED |

R = RED Y = YELLOW G = GREEN

* TRAIN EXCEEDING MEDIUM SPEED MUST IMMEDIATELY REDUCE TO THAT SPEED

† TRAIN EXCEEDING LIMITED SPEED MUST IMMEDIATELY REDUCE TO THAT SPEED

FIG. 7A

| ASPECTS OF SIGNALS AT: | A | B | C |
|---|---|---|---|
| IF CLEARED FOR ROUTE STRAIGHT THROUGH TO TRACK (1) (NORMAL SPEED) | G<br>R<br>R | G<br>R<br>R | G<br>R<br>R |
| IF CLEARED FOR DIVERGING ROUTE THROUGH HIGH-SPEED TURNOUT TO TRACK (2) (LIMITED SPEED = 50 MPH) | G<br>R<br>R | Y<br>G<br>G | R<br>G<br>G |
| IF CLEARED FOR DIVERGING ROUTE THROUGH NO. 16 CROSSOVER TO TRACK (3) (MEDIUM SPEED = 30 MPH) | G<br>Y<br>R | Y<br>G<br>R | R<br>G<br>R |
| IF CLEARED FOR DIVERGING ROUTE THROUGH NO. 12 CROSSOVER INTO TRACK (4) (SLOW SPEED = 15 MPH) | Y<br>G<br>R | Y<br>R<br>G | R<br>R<br>G |

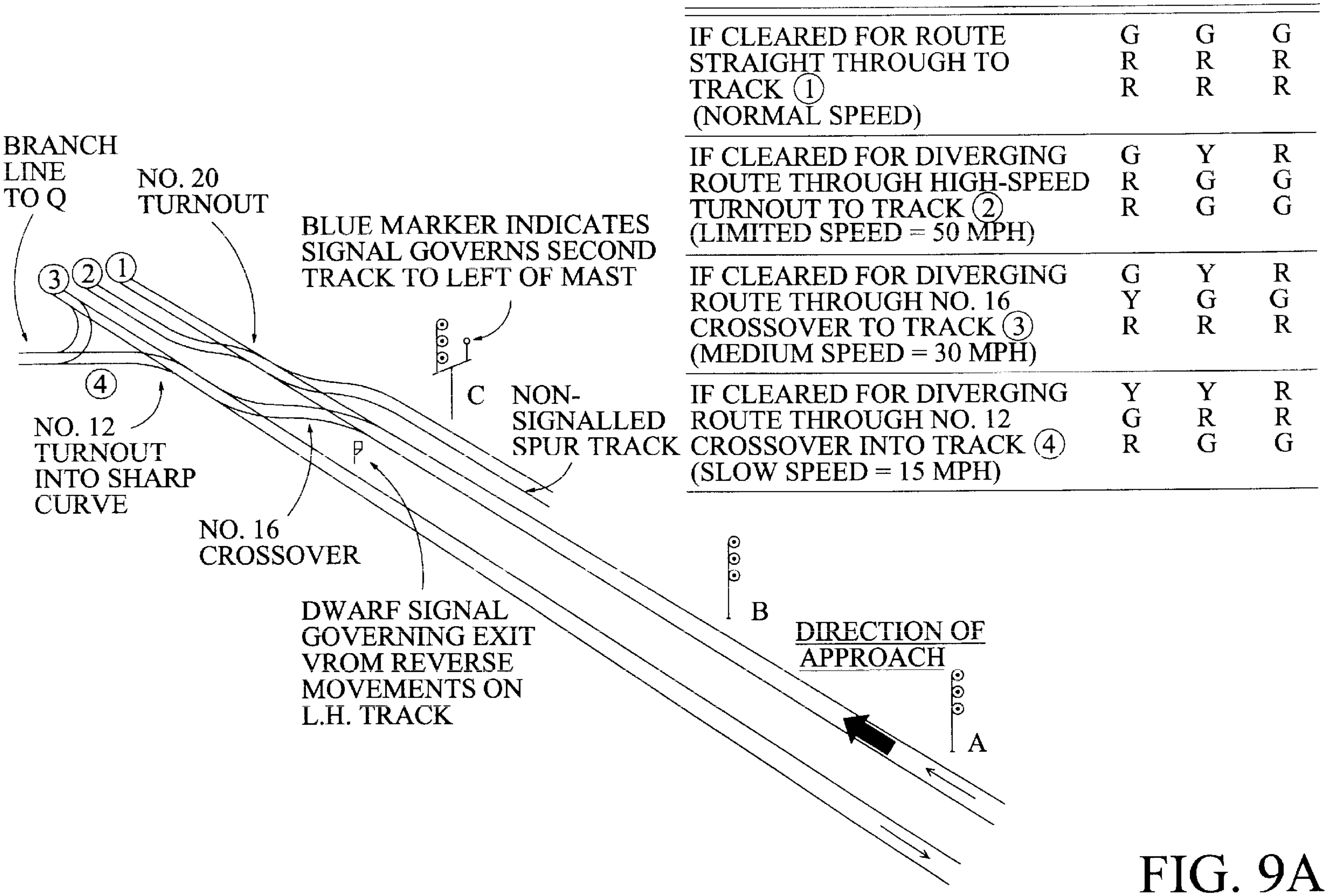

FIG. 9A

| ASPECT | NAME | INDICATION |
|---|---|---|
| G<br>R<br>R | CLEAR | PROCEED AT NORMAL SPEED |
| Y<br>R<br>R | APPROACH | PROCEED APPROACHING NEXT SIGNAL PREPARED TO STOP; TRAIN EXCEEDING MEDIUM SPEED MUST IMMEDIATELY REDUCE TO THAT SPEED |
| Y<br>R<br>G | APPROACH SLOW | PROCEED APPROACHING NEXT SIGNAL AT SLOW SPEED; TRAIN EXCEEDING MEDUM SPEED MUST IMMEDIATELY REDUCE TO THAT SPEED. |
| G<br>Y<br>R | ADVANCE APPROACH MEDIUM | PROCEED APPROACHING SECOND SIGNAL AT MEDIUM SPEED. |
| Y<br>G<br>R | APPROACH MEDIUM | PROCEED APPROACHING NEXT SIGNAL AT MEDIUM SPEED. |
| Y<br>G<br>G* | APPROACH LIMITED | PROCEED APPROACHING NEXT SIGNAL AT LIMITED SPEED |
| R<br>G<br>R | MEDIUM CLEAR | PROCEED; MEDIUM SPEED WITHIN INTERLOCKING LIMITS |
| R<br>G<br>G* | LIMITED CLEAR | PROCEED; LIMITED SPEED WITHIN INTERLOCKING LIMITS |
| R<br>R<br>G | SLOW CLEAR | PROCEED; SLOW SPEED WITHIN INTERLOCKING LIMITS |

* MAY BE REPLACED WITH TRIANGULAR MARKER PLATE BELOW SECOND SIGNAL HEAD (INDICATING "LIMITED SPEED") IF LAYOUT DOES NOT INCLUDE MEDIUM SPEED ROUTES

FIG. 9B

MODEL TRAIN CONTROL SYSTEM

This application is a Continuation of U.S. patent application Ser. No. 09/104,416 filed Jun. 25, 1998 now U.S. Pat. No. 6,065,406.

BACKGROUND OF THE INVENTION

The present invention relates to a system for controlling a model railroad.

Model railroads have traditionally been constructed with of a set of interconnected sections of train track, electric switches between different sections of the train track, and other electrically operated devices, such as train engines and draw bridges. Train engines receive their power to travel on the train track by electricity provided by a controller through the track itself. The speed and direction of the train engine is controlled by the level and polarity, respectively, of the electrical power supplied to the train track. The operator manually pushes buttons or pulls levers to cause the switches or other electrically operated devices to function, as desired. Such model railroad sets are suitable for a single operator, but unfortunately they lack the capability of adequately controlling multiple trains independently. In addition, such model railroad sets are not suitable for being controlled by multiple operators, especially if the operators are located at different locations distant from the model railroad, such as different cities.

A digital command control (DDC) system has been developed to provide additional controllability of individual train engines and other electrical devices. Each device the operator desires to control, such as a train engine, includes an individually addressable digital decoder. A digital command station (DCS) is electrically connected to the train track to provide a command in the form of a set of encoded digital bits to a particular device that includes a digital decoder. The digital command station is typically controlled by a personal computer. A suitable standard for the digital command control system is the NMRA DCC Standards, issued March 1997, and is incorporated herein by reference. While providing the ability to individually control different devices of the railroad set, the DCC system still fails to provide the capability for multiple operators to control the railroad devices, especially if the operators are remotely located from the railroad set and each other.

DigiToys Systems of Lawrenceville, Ga. has developed a software program for controlling a model railroad set from a remote location. The software includes an interface which allows the operator to select desired changes to devices of the railroad set that include a digital decoder, such as increasing the speed of a train or switching a switch. The software issues a command locally or through a network, such as the internet, to a digital command station at the railroad set which executes the command. The protocol used by the software is based on Cobra from Open Management Group where the software issues a command to a communication interface and awaits confirmation that the command was executed by the digital command station. When the software receives confirmation that the command executed, the software program sends the next command through the communication interface to the digital command station. In other words, the technique used by the software to control the model railroad is analogous to an inexpensive printer where commands are sequentially issued to the printer after the previous command has been executed. Unfortunately, it has been observed that the response of the model railroad to the operator appears slow, especially over a distributed network such as the internet. One technique to decrease the response time is to use high-speed network connections but unfortunately such connections are expensive.

What is desired, therefore, is a system for controlling a model railroad that effectively provides a high-speed connection without the additional expense associated therewith.

The foregoing and other objectives, features, and advantages of the invention will be more readily understood upon consideration of the following detailed description of the invention, taken in conjunction with the accompanying drawings.

SUMMARY OF THE PRESENT INVENTION

The present invention overcomes the aforementioned drawbacks of the prior art, in a first aspect, by providing a system for operating a digitally controlled model railroad that includes transmitting a first command from a first client program to a resident external controlling interface through a first communications transport. A second command is transmitted from a second client program to the resident external controlling interface through a second communications transport. The first command and the second command are received by the resident external controlling interface which queues the first and second commands. The resident external controlling interface sends third and fourth commands representative of the first and second commands, respectively, to a digital command station for execution on the digitally controlled model railroad.

Incorporating a communications transport between the multiple client program and the resident external controlling interface permits multiple operators of the model railroad at locations distant from the physical model railroad and each other. In the environment of a model railroad club where the members want to simultaneously control devices of the same model railroad layout, which preferably includes multiple trains operating thereon, the operators each provide commands to the resistant external controlling interface, and hence the model railroad. In addition by queuing by commands at a single resident external controlling interface permits controlled execution of the commands by the digitally controlled model railroad, would may otherwise conflict with one another.

In another aspect of the present invention the first command is selectively processed and sent to one of a plurality of digital command stations for execution on the digitally controlled model railroad based upon information contained therein. Preferably, the second command is also selectively processed and sent to one of the plurality of digital command stations for execution on the digitally controlled model railroad based upon information contained therein. The resident external controlling interface also preferably includes a command queue to maintain the order of the commands.

The command queue also allows the sharing of multiple devices, multiple clients to communicate with the same device (locally or remote) in a controlled manner, and multiple clients to communicate with different devices. In other words, the command queue permits the proper execution in the cases of: (1) one client to many devices, (2) many clients to one device, and (3) many clients to many devices.

In yet another aspect of the present invention the first command is transmitted from a first client program to a first processor through a first communications transport. The first command is received at the first processor. The first processor provides an acknowledgement to the first client program through the first communications transport indicating that the first command has properly executed prior to execution of commands related to the first command by the digitally controlled model railroad. The communications transport is preferably a COM or DCOM interface.

The model railroad application involves the use of extremely slow real-time interfaces between the digital command stations and the devices of the model railroad. In order to increase the apparent speed of execution to the client, other than using high-speed communication interfaces, the resident external controller interface receives the command and provides an acknowledgement to the client program in a timely manner before the execution of the command by the digital command stations. Accordingly, the execution of commands provided by the resident external controlling interface to the digital command stations occur in a synchronous manner, such as a first-in-first-out manner. The COM and DCOM communications transport between the client program and the resident external controlling interface is operated in an asynchronous manner, namely providing an acknowledgement thereby releasing the communications transport to accept further communications prior to the actual execution of the command. The combination of the synchronous and the asynchronous data communication for the commands provides the benefit that the operator considers the commands to occur nearly instantaneously while permitting the resident external controlling interface to verify that the command is proper and cause the commands to execute in a controlled manner by the digital command stations, all without additional high-speed communication networks. Moreover, for traditional distributed software execution there is no motivation to provide an acknowledgment prior to the execution of the command because the command executes quickly and most commands are sequential in nature. In other words, the execution of the next command is dependent upon proper execution of the prior command so there would be no motivation to provide an acknowledgment prior to its actual execution.

BRIEF DESCRIPTION OF THE SEVERAL VIEWS OF THE DRAWINGS

FIG. 5 is an illustration of a manual block signaling arrangement.

FIGS. 7A and 7B are illustrations of block signaling and track capacity.

FIGS. 9A and 9B are illustrations of speed signaling in approach to a junction.

DETAILED DESCRIPTION OF THE PREFERRED EMBODIMENT

Figure 1:
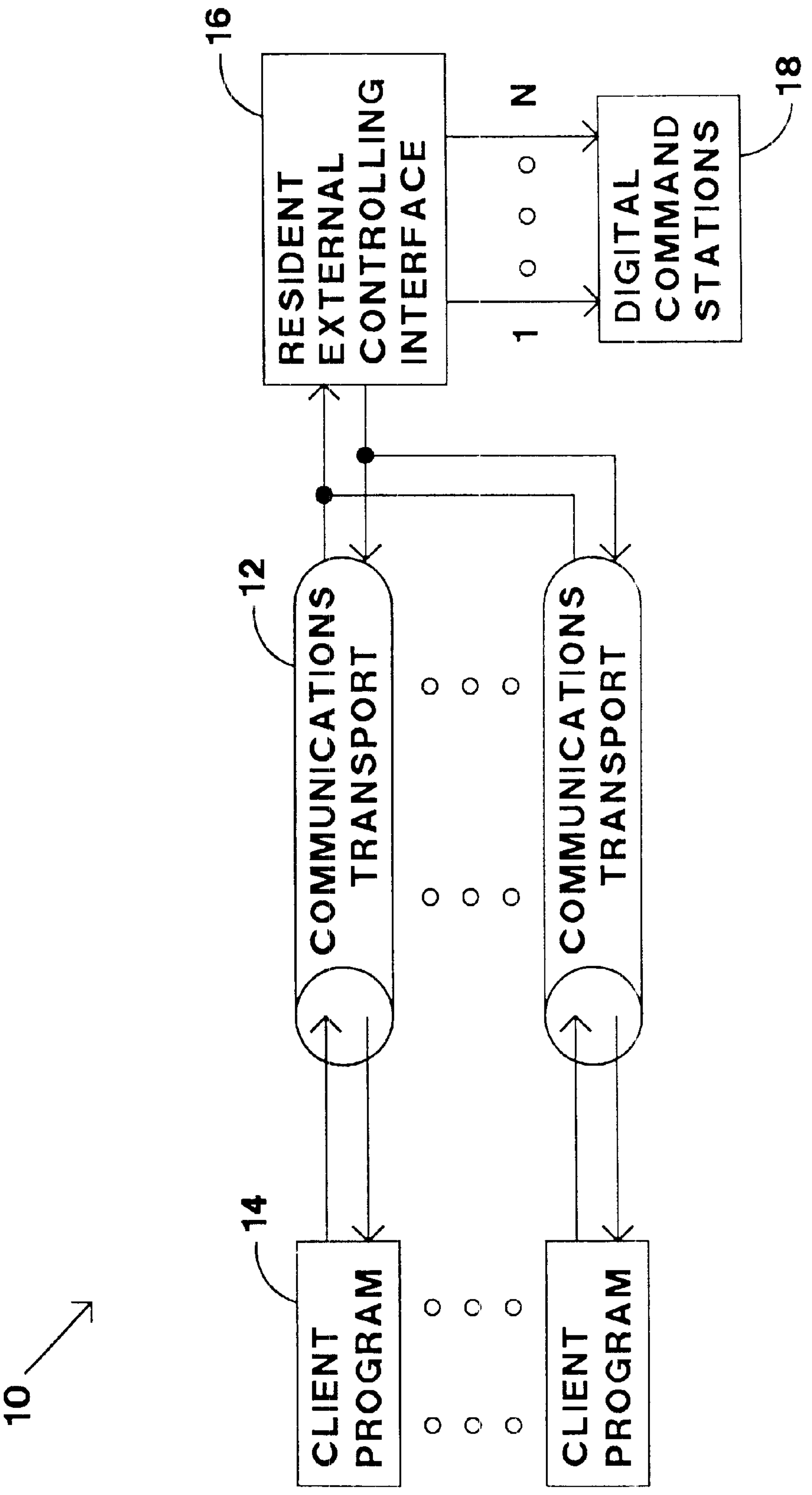
FIG. 1 is a block diagram of an exemplary embodiment of a model train control system.

Referring to FIG. 1, a model train control system 10 includes a communications transport 12 interconnecting a client program 14 and a resident external controlling interface 16. The client program 14 executes on the model railroad operator's computer and may include any suitable system to permit the operator to provide desired commands to the resident external controlling interface 16. For example, the client program 14 may include a graphical interface representative of the model railroad layout where the operator issues commands to the model railroad by making changes to the graphical interface. The client program 14 also defines a set of Application Programming Interfaces (API's), described in detail later, which the operator accesses using the graphical interface or other programs such as Visual Basic, C++, Java, or browser based applications. There may be multiple client programs interconnected with the resident external controlling interface 16 so that multiple remote operators may simultaneously provide control commands to the model railroad.

The communications transport 12 provides an interface between the client program 14 and the resident external controlling interface 16. The communications transport 12 may be any suitable communications medium for the transmission of data, such as the internet, local area network, satellite links, or multiple processes operating on a single computer. The preferred interface to the communications transport 12 is a COM or DCOM interface, as developed for the Windows operating system available from Microsoft Corporation. The communications transport 12 also determines if the resident external controlling interface 16 is system resident or remotely located on an external system. The communications transport 12 may also use private or public communications protocol as a medium for communications. The client program 14 provides commands and the resident external controlling interface 16 responds to the communications transport 12 to exchange information. A description of COM (common object model) and DCOM (distributed common object model) is provided by Chappel in a book entitled Understanding ActiveX and OLE, Microsoft Press, and is incorporated by reference herein.

Incorporating a communications transport 12 between the client program(s) 14 and the resident external controlling interface 16 permits multiple operators of the model railroad at locations distant from the physical model railroad and each other. In the environment of a model railroad club where the members want to simultaneously control devices of the same model railroad layout, which preferably includes multiple trains operating thereon, the operators each provide commands to the resistant external controlling interface, and hence the model railroad.

The manner in which commands are executed for the model railroad under COM and DCOM may be as follows. The client program 14 makes requests in a synchronous manner using COM/DCOM to the resident external interface controller 16. The synchronous manner of the request is the technique used by COM and DCOM to execute commands. The communications transport 12 packages the command for the transport mechanism to the resident external controlling interface 16. The resident external controlling interface 16 then passes the command to the digital command stations 18 which in turn executes the command. After the digital command station 18 executes the command an acknowledgement is passed back to the resident external controlling interface 16 which in turn passes an acknowledgement to the client program 14. Upon receipt of the acknowledgement by the client program 14, the communications transport 12 is again available to accept another command. The train control system 10, without more, permits execution of commands by the digital command stations 18 from multiple operators, but like the DigiToys System' software the execution of commands is slow.

The present inventor came to the realization that unlike traditional distributed systems where the commands passed through a communications transport are executed nearly instantaneously by the server and then an acknowledgement is returned to the client, the model railroad application involves the use of extremely slow real-time interfaces between the digital command stations and the devices of the model railroad. The present inventor came to the further realization that in order to increase the apparent speed of execution to the client, other than using high-speed communication interfaces, the resident external controller interface 16 should receive the command and provide an acknowledgement to the client program 12 in a timely manner before the execution of the command by the digital command stations 18. Accordingly, the execution of commands provided by the resident external controlling interface 16 to the digital command stations 18 occur in a synchronous manner, such as a first-in-first-out manner. The COM and DCOM communications transport 12 between the client program 14 and the resident external controlling interface 16 is operated in an asynchronous manner, namely providing an acknowledgement thereby releasing the communications transport 12 to accept further communications prior to the actual execution of the command. The combination of the synchronous and the asynchronous data communication for the commands provides the benefit that the operator considers the commands to occur nearly instantaneously while permitting the resident external controlling interface 16 to verify that the command is proper and cause the commands to execute in a controlled manner by the digital command stations 18, all without additional high-speed communication networks. Moreover, for traditional distributed software execution there is no motivation to provide an acknowledgment prior to the execution of the command because the command executes quickly and most commands are sequential in nature. In other words, the execution of the next command is dependent upon proper execution of the prior command so there would be no motivation to provide an acknowledgment prior to its actual execution. It is to be understood that other devices, such as digital devices, may be controlled in a manner as described for model railroads.

Figure 2:
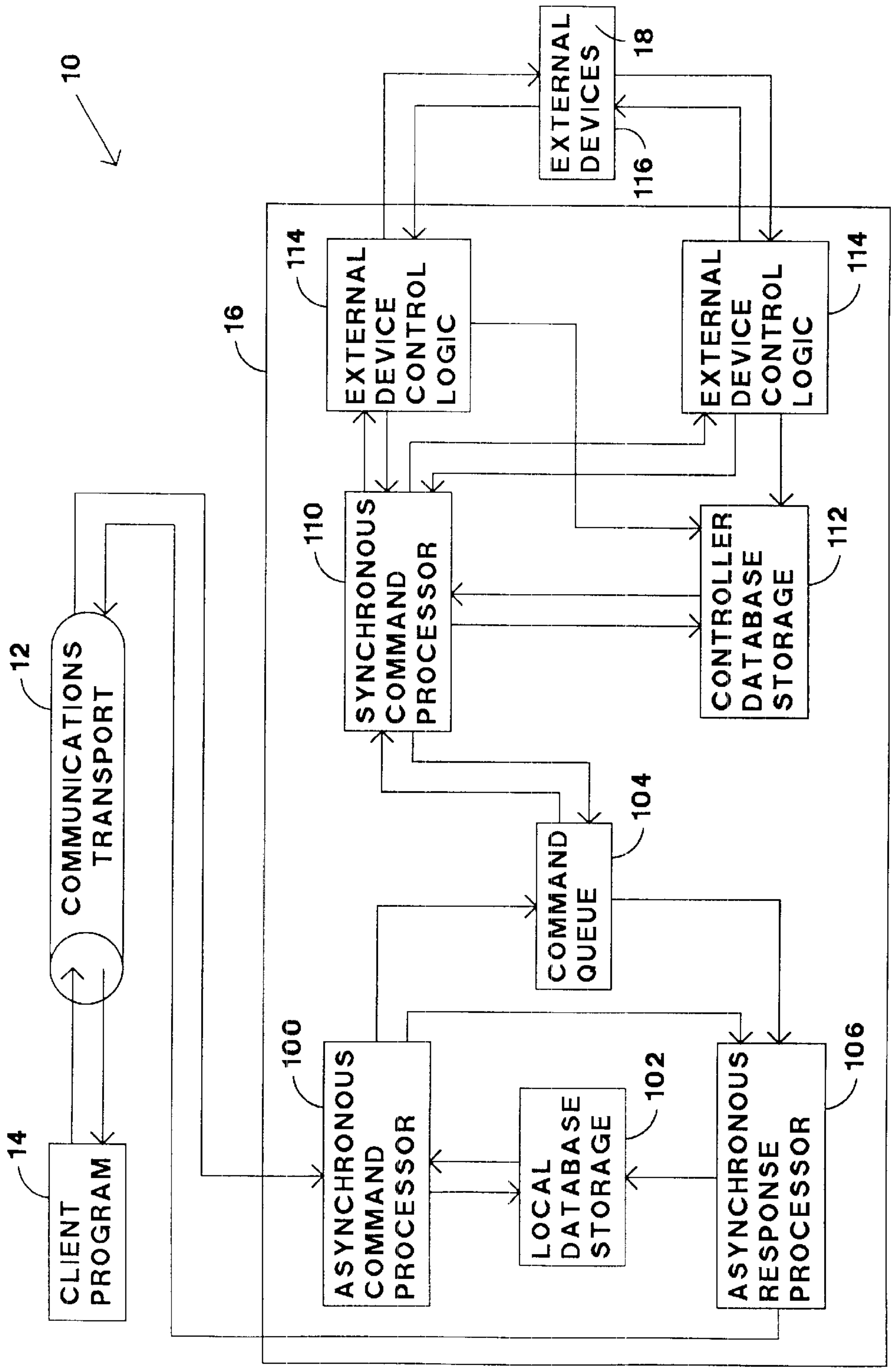
FIG. 2 is a more detailed block diagram of the model train control system of FIG. 1 including external device control logic.

Referring to FIG. 2, the client program 14 sends a command over the communications transport 12 that is received by an asynchronous command processor 100. The asynchronous command processor 100 queries a local database storage 102 to determine if it is necessary to package a command to be transmitted to a command queue 104. The local database storage 102 primarily contains the state of the devices of the model railroad, such as for example, the speed of a train, the direction of a train, whether a draw bridge is up or down, whether a light is turned on or off, and the configuration of the model railroad layout. If the command received by the asynchronous command processor 100 is a query of the state of a device, then the asynchronous command processor 100 retrieves such information from the local database storage 102 and provides the information to an asynchronous response processor 106. The asynchronous response processor 106 then provides a response to the client program 14 indicating the state of the device and releases the communications transport 12 for the next command.

The asynchronous command processor 100 also verifies, using the configuration information in the local database storage 102, that the command received is a potentially valid operation. If the command is invalid, the asynchronous command processor 100 provides such information to the asynchronous response processor 106, which in turn returns an error indication to the client program 14.

The asynchronous command processor 100 may determine that the necessary information is not contained in the local database storage 102 to provide a response to the client program 14 of the device state or that the command is a valid action. Actions may include, for example, an increase in the train's speed, or turning on/off of a device. In either case, the valid unknown state or action command is packaged and forwarded to the command queue 104. The packaging of the command may also include additional information from the local database storage 102 to complete the client program 14 request, if necessary. Together with packaging the command for the command queue 104, the asynchronous command processor 100 provides a command to the asynchronous request processor 106 to provide a response to the client program 14 indicating that the event has occurred, even though such an event has yet to occur on the physical railroad layout.

As such, it can be observed that whether or not the command is valid, whether or not the information requested by the command is available to the asynchronous command processor 100, and whether or not the command has executed, the combination of the asynchronous command processor 100 and the asynchronous response processor 106 both verifies the validity of the command and provides a response to the client program 14 thereby freeing up the communications transport 12 for additional commands. Without the asynchronous nature of the resident external controlling interface 16, the response to the client program 14 would be, in many circumstances, delayed thereby resulting in frustration to the operator that the model railroad is performing in a slow and painstaking manner. In this manner, the railroad operation using the asynchronous interface appears to the operator as nearly instantaneously responsive.

Each command in the command queue 104 is fetched by a synchronous command processor 110 and processed. The synchronous command processor 110 queries a controller database storage 112 for additional information, as necessary, and determines if the command has already been executed based on the state of the devices in the controller database storage 112. In the event that the command has already been executed, as indicated by the controller database storage 112, then the synchronous command processor 110 passes information to the command queue 104 that the command has been executed or the state of the device. The asynchronous response processor 106 fetches the information from the command cue 104 and provides a suitable response to the client program 14, if necessary, and updates the local database storage 102 to reflect the updated status of the railroad layout devices.

If the command fetched by the synchronous command processor 110 from the command queue 104 requires execution by external devices, such as the train engine, then the command is posted to one of several external device control logic 114 blocks. The external device control logic 114 processes the command from the synchronous command processor 110 and issues appropriate control commands to the interface of the particular external device 116 to execute the command on the device and ensure that an appropriate response was received in response. The external device is preferably a digital command control device that transmits digital commands to decoders using the train track. There are several different manufacturers of digital command stations, each of which has a different set of input commands, so each external device is designed for a particular digital command station. In this manner, the system is compatible with different digital command stations. The digital command stations 18 of the external devices 116 provide a response to the external device control logic 114 which is checked for validity and identified as to which prior command it corresponds to so that the controller database storage 112 may be updated properly. The process of transmitting commands to and receiving responses from the external devices 116 is slow.

The synchronous command processor 110 is notified of the results from the external control logic 114 and, if appropriate, forwards the results to the command queue 104. The asynchronous response processor 100 clears the results from the command queue 104 and updates the local database storage 102 and sends an asynchronous response to the client program 14, if needed. The response updates the client program 14 of the actual state of the railroad track devices, if changed, and provides an error message to the client program 14 if the devices actual state was previously improperly reported or a command did not execute properly.

The use of two separate database storages, each of which is substantially a mirror image of the other, provides a performance enhancement by a fast acknowledgement to the client program 14 using the local database storage 102 and thereby freeing up the communications transport 12 for additional commands. In addition, the number of commands forwarded to the external device control logic 114 and the external devices 116, which are relatively slow to respond, is minimized by maintaining information concerning the state and configuration of the model railroad. Also, the use of two separate database tables 102 and 112 allows more efficient multi-threading on multi-processor computers.

In order to achieve the separation of the asynchronous and synchronous portions of the system the command queue 104 is implemented as a named pipe, as developed by Microsoft for Windows. The queue 104 allows both portions to be separate from each other, where each considers the other to be the destination device. In addition, the command queue maintains the order of operation which is important to proper operation of the system.

The use of a single command queue 104 allows multiple instantrations of the asynchronous functionality, with one for each different client. The single command queue 104 also allows the sharing of multiple devices, multiple clients to communicate with the same device (locally or remote) in a controlled manner, and multiple clients to communicate with different devices. In other words, the command queue 104 permits the proper execution in the cases of: (1) one client to many devices, (2) many clients to one device, and (3) many clients to many devices.

The present inventor came to the realization that the digital command stations provided by the different vendors have at least three different techniques for communicating with the digital decoders of the model railroad set. The first technique, generally referred to as a transaction (one or more operations), is a synchronous communication where a command is transmitted, executed, and a response is received therefrom prior to the transmission of the next sequentially received command. The DCS may execute multiple commands in this transaction. The second technique is a cache with out of order execution where a command is executed and a response received therefrom prior to the execution of the next command, but the order of execution is not necessarily the same as the order that the commands were provided to the command station. The third technique is a local-area-network model where the commands are transmitted and received simultaneously. In the LAN model there is no requirement to wait until a response is received for a particular command prior to sending the next command. Accordingly, the LAN model may result in many commands being transmitted by the command station that have yet to be executed. In addition, some digital command stations use two or more of these techniques.

With all these different techniques used to communicate with the model railroad set and the system 10 providing an interface for each different type of command station, there exists a need for the capability of matching up the responses from each of the different types of command stations with the particular command issued for record keeping purposes. Without matching up the responses from the command stations, the databases can not be updated properly.

Figure 3:
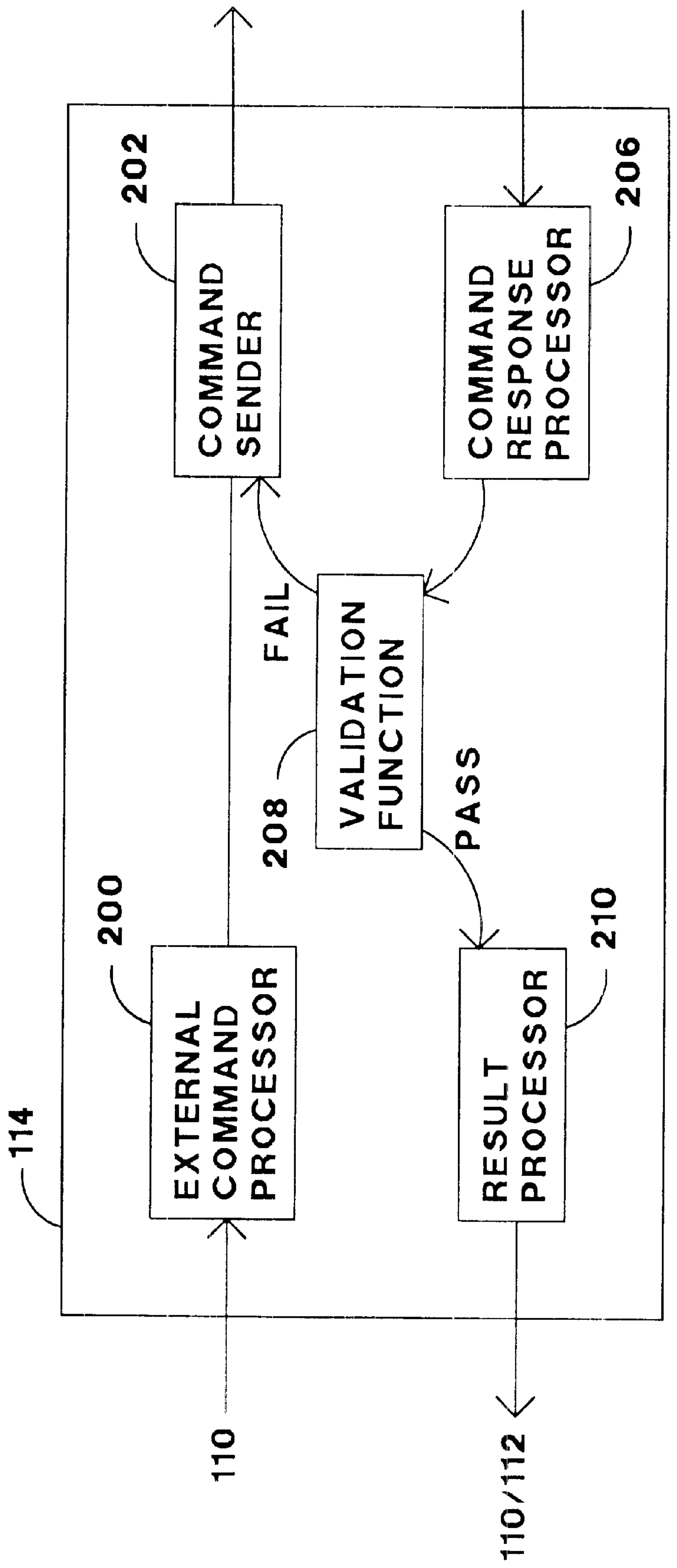
FIG. 3 is a block diagram of the external device control logic of FIG. 2.

Validation functionality is included within the external device control logic 114 to accommodate all of the different types of command stations. Referring to FIG. 3, an external command processor 200 receives the validated command from the synchronous command processor 110. The external command processor 200 determines which device the command should be directed to, the particular type of command it is, and builds state information for the command. The state information includes, for example, the address, type, port, variables, and type of commands to be sent out. In other words, the state information includes a command set for a particular device on a particular port device. In addition, a copy of the original command is maintained for verification purposes. The constructed command is forwarded to the command sender 202 which is another queue, and preferably a circular queue. The command sender 202 receives the command and transmits commands within its queue in a repetitive nature until the command is removed from its queue. A command response processor 204 receives all the commands from the command stations and passes the commands to the validation function 206. The validation function 206 compares the received command against potential commands that are in the queue of the command sender 202 that could potentially provide such a result. The validation function 206 determines one of four potential results from the comparison. First, the results could be simply bad data that is discarded. Second, the results could be partially executed commands which are likewise normally discarded. Third, the results could be valid responses but not relevant to any command sent. Such a case could result from the operator manually changing the state of devices on the model railroad or from another external device, assuming a shared interface to the DCS. Accordingly, the results are validated and passed to the result processor 210. Fourth, the results could be valid responses relevant to a command sent. The corresponding command is removed from the command sender 202 and the results passed to the result processor 210. The commands in the queue of the command sender 202, as a result of the validation process 206, are retransmitted a predetermined number of times, then if error still occurs the digital command station is reset, which if the error still persists then the command is removed and the operator is notified of the error.

APPLICATION PROGRAMMING INTERFACE

Train Tools™ Interface Description

Building your own visual interface to a model railroad

Copyright 1992–1998 KAM Industries.

Computer Dispatcher, Engine Commander, The Conductor, Train Server, and Train Tools are Trademarks of KAM Industries, all Rights Reserved.

Questions concerning the product can be EMAILED to:
traintools@kam.rain.com
You can also mail questions to:
KAM Industries
2373 NW. 185th Avenue Suite 416
Hillsboro, Oreg. 97124
FAX—(503) 291-1221

Table of contents

| | |
|---|---|
| 1. | OVERVIEW |
| 1.1 | System Architecture |
| 2. | TUTORIAL |
| 2.1 | Visual BASIC Throttle Example Application |
| 2.2 | Visual BASIC Throttle Example Source Code |
| 3. | IDL COMMAND REFERENCE |
| 3.1 | Introduction |
| 3.2 | Data Types |
| 3.3 | Commands to access the server configuration variable database |
| | KamCVGetValue |
| | KamCVPutValue |
| | KamCVGetEnable |
| | KamCVPutEnable |
| | KamCVGetName |
| | KamCVGetMinRegister |
| | KamCVGetMaxRegister |
| 3.4 | Commands to program configuration variables |
| | KamProgram |
| | KamProgramGetMode |
| | KamProgramGetStatus |
| | KamProgramReadCV |
| | KamProgramCV |
| | KamProgramReadDecoderToDataBase |
| | KamProgramDecoderFromDataBase |
| 3.5 | Commands to control all decoder types |
| | KamDecoderGetMaxModels |
| | KamDecoderGetModelName |
| | KamDecoderSetModelToObj |
| | KamDecoderGetMaxAddress |
| | KamDecoderChangeOldNewAddr |
| | KamDecoderMovePort |
| | KamDecoderGetPort |
| | KamDecoderCheckAddrInUse |
| | KamDecoderGetModelFromObj |
| | KamDecoderGetModelFacility |
| | KamDecoderGetObjCount |
| | KamDecoderGetObjAtIndex |
| | KamDecoderPutAdd |
| | KamDecoderPutDel |
| | KamDecoderGetMfgName |
| | KamDecoderGetPowerMode |
| | KamDecoderGetMaxSpeed |
| 3.6 | Commands to control locomotive decoders |
| | KamEngGetSpeed |
| | KamEngPutSpeed |
| | KamEngGetSpeedSteps |
| | KamEngPutSpeedSteps |
| | KamEngGetFunction |
| | KamEngPutFunction |
| | KamEngGetFunctionMax |
| | KamEngGetName |
| | KamEngPutName |
| | KamEngGetFunctionName |
| | KamEngPutFunctionName |
| | KamEngGetConsistMax |
| | KamEngPutConsistParent |
| | KamEngPutConsistChild |

-continued

Table of contents

| | |
|---|---|
| | KamEngPutConsistRemoveObj |
| 3.7 | Commands to control accessory decoders |
| | KamAccGetFunction |
| | KamAccGetFunctionAll |
| | KamAccPutFunction |
| | KamAccPutFunctionAll |
| | KamAccGetFunctionMax |
| | KamAccGetName |
| | KamAccPutName |
| | KamAccGetFunctionName |
| | KamAccPutFunctionName |
| | KamAccRegFeedback |
| | KamAccRegFeedbackAll |
| | KamAccDelFeedback |
| | KamAccDelFeedbackAll |
| 3.8 | Commands to control the command station |
| | KamOprPutTurnOnStation |
| | KamOprPutStartStation |
| | KamOprPutClearStation |
| | KamOprPutStopStation |
| | KamOprPutPowerOn |
| | KamOprPutPowerOff |
| | KamOprPutHardReset |
| | KamOprPutEmergencyStop |
| | KamOprGetStationStatus |
| 3.9 | Commands to configure the command station communication port |
| | KamPortPutConfig |
| | KamPortGetConfig |
| | KamPortGetName |
| | KamPortPutMapController |
| | KamPortGetMaxLogPorts |
| | KamPortGetMaxPhysical |
| 3.10 | Commands that control command flow to the command station |
| | KamCmdConnect |
| | KamCmdDisConnect |
| | KamCmdCommand |
| 3.11 | Cab Control Commands |
| | KamCabGetMessage |
| | KamCabPutMessage |
| | KamCabGetCabAddr |
| | KamCabPutAddrToCab |
| 3.12 | Miscellaneous Commands |
| | KamMiscGetErrorMsg |
| | KamMiscGetClockTime |
| | KamMiscPutClockTime |
| | KamMiscGetInterfaceVersion |
| | KamMiscSaveData |
| | KamMiscGetControllerName |
| | KamMiscGetControllerNameAtPort |
| | KamMiscGetCommandStationValue |
| | KamMiscSetCommandStationValue |
| | KamMiscGetCommandStationIndex |
| | KamMiscMaxControllerID |
| | KamMiscGetControllerFacility |

```
I.        OVERVIEW
                    This document is divided into two sections, the
Tutorial, and the IDL Command Reference. The tutorial
shows the complete code for a simple Visual BASIC program
that controls all the major functions of a locomotive.
This program makes use of many of the commands described
in the reference section. The IDL Command Reference
describes each command in detail.
I.        TUTORIAL
          A.       Visual BASIC Throttle Example Application
                   The following application is created using the
Visual BASIC source code in the next section. It
controls all major locomotive functions such as speed,
direction, and auxiliary functions.
A.        Visual BASIC Throttle Example Source Code
'    Copyright 1998, KAM Industries. All rights reserved.
'
'         This is a demonstration program showing the
'         integration of VisualBasic and Train Server(tm)
'         interface. You may use this application for non
'         commercial usage.
'
'$Date: $
'$Author: $
'$Revision: $
'$Log: $
'         Engine Commander, Computer Dispatcher, Train Server,
'         Train Tools, The Conductor and kamind are registered
'         Trademarks of KAM Industries. All rights reserved.
'
'         This first command adds the reference to the Train
'         ServerT Interface object Dim EngCmd As New EngComIfc
'
'         Engine Commander uses the term Ports, Devices and
'         Controllers
'         Ports —> These are logical ids where Decoders are
'         assigned to. Train ServerT Interface supports a
'         limited number of logical ports. You can also think
'         of ports as mapping to a command station type. This
'         allows you to move decoders between command station
'         without losing any information about the decoder
'
'         Devices —> These are communications channels
'         configured in your computer.
'         You may have a single device (com1) or multiple
'         devices
'         (COM 1 - COM8, LPT1, Other). You are required to
'         map a port to a device to access a command station.
'         Devices start from ID 0 —> max id (FYI; devices do
'         not necessarily have to be serial channel. Always
'         check the name of the device before you use it as
'         well as the maximum number of devices supported.
'         The Command
'         EngCmd.KamPortGetMaxPhysical(lMaxPhysical, lSerial,
'         lParallel) provides means that . . . lMaxPhysical =
'         lSerial + lParallel + lOther
'
'         Controller - These are command the command station
'         like LENZ, Digitrax
'         Northcoast, EasyDCC, Marklin . . . It is recommend
'         that you check the command station ID before you
'         use it.
'
'         Errors        - All commands return an error status. If
'                         the error value is non zero, then the
'                         other return arguments are invalid. In
'                         general, non zero errors means command was
'                         not executed. To get the error message,
'                         you need to call KamMiscErrorMessage and
'                         supply the error number
'
'         To Operate your layout you will need to perform a
'         mapping between a Port (logical reference), Device
'         (physical communications channel) and a Controller
'         (command station) for the program to work. All
'         references uses the logical device as the reference
'         device for access.
```

-continued

```
'
'        Addresses used are an object reference. To use an
'        address you must add the address to the command
'        station using KamDecoderPutAdd . . . One of the return
'        values from this operation is an object reference
'        that is used for control.
'
'        We need certain variables as global objects; since
'        the information is being used multiple times
Dim iLogicalPort, iController, iComPort
Dim iPortRate, iPortParity, iPortStop, iPortRetrans,
        iPortWatchdog, iPortFlow, iPortData
Dim lEngineObject As Long, iDecoderClass As Integer,
iDecoderType    As Integer
Dim lMaxController As Long
Dim lMaxLogical As Long, lMaxPhysical As Long, lMaxSerial
        As Long, lMaxParallel As Long
'**************************************
'Form load function
'- Turn of the initial buttons
'- Set he interface information
'**************************************
Private Sub Form_load()
        Dim strVer As String, strCom As String, strCntrl As
            String
        Dim iError As Integer
        'Get the interface version information
        SetButtonState (False)
        iError = EngCmd.KamMiscGetInterfaceVersion(strVer)
        If (iError) Then
            MsgBox ((“Train Server not loaded. Check
                DCOM-95”))
            iLogicalPort = 0
            LogPort.Caption = iLogicalPort
            ComPort.Caption = “???”
            Controller.Caption = “Unknown”
        Else
            MsgBox ((“Simulation(COM1) Train Server - - ” &
                strVer))
                '**************************************
                'Configuration information; Only need to
                    change these values to use a different
                    controller . . .
                '**************************************
                ' UNKNOWN           0 // Unknown control type
                ' SIMULAT           1 // Interface simulator
                ' LENZ_1x           2 // Lenz serial support module
                ' LENZ_2x           3 // Lenz serial support module
                ' DIGIT_DT200       4 // Digitrax direct drive
                                        support using DT200
                ' DIGIT_DCS100      5 // Digitrax direct drive
                                        support using DCS100
                ' MASTERSERIES      6 // North Coast engineering
                                        master Series
                ' SYSTEMONE         7 // System One
                ' RAMFIX            8 // RAMFIxx system
                ' DYNATROL          9 // Dynatrol system
                ' Northcoast binary 10 // North Coast binary
                ' SERIAL            11 // NMRA Serial
                                        interface
                ' EASYDCC           12 // NMRA Serial interface
                ' MRK6050           13 // 6050 Marklin interface
                                        (AC and DC)
                ' MRK6023           14 // 6023 Marklin hybrid
                                        interface (AC)
                ' ZTC               15 // ZTC Systems ltd
                ' DIGIT_PR1         16 // Digitrax direct drive
                                        support using PR1
                ' DIRECT            17 // Direct drive interface
                                        routine
'*******************************************************************
        iLogicalPort = 1 'Select Logical port 1 for
                            communications
        iController = 1 'Select controller from the list
                            above.
        iComPort = 0 ' use COM1; 0 means com1 (Digitrax must
                            use Com1 or Com2)
                'Digitrax Baud rate requires 16.4K!
                'Most COM ports above Com2 do not
```

-continued

```
                    'support 16.4K. Check with the
                    'manufacture of your smart com card
                    'for the baud rate. Keep in mind that
                    'Dumb com cards with serial port
                    'support Com1 - Com4 can only support
                    '2 com ports (like com1/com2
                    'or com3/com4)
                    'If you change the controller, do not
                    'forget to change the baud rate to
                    'match the command station. See your
                    'user manual for details
'*******************************************************************
                    ' 0: // Baud rate is 300
                    ' 1: // Baud rate is 1200
                    ' 2: // Baud rate is 2400
                    ' 3: // Baud rate is 4800
                    ' 4: // Baud rate is 9600
                    ' 5: // Baud rate is 14.4
                    ' 6: // Baud rate is 16.4
                    ' 7: // Baud rate is 19.2
                    iPortRate = 4
                    '    Parity values 0-4 —> no, odd, even, mark,
                         space
                    iPortParity = 0
                    '    Stop bits 0,1,2 —> 1, 1.5, 2
                    iPortStop = 0
                    iPortRetrans = 10
                    iPortWatchdog = 2048
                    iPortFlow = 0
                    '    Data bits 0 —> 7 Bits, 1 —> 8 bits
                    iPortData = 1
          'Display the port and controller information
          iError = EngCmd.KamPortGetMaxLogPorts(lMaxLogical)
          iError = EngCmd.KamPortGetMaxPhysical(lMaxPhysical,
                         lMaxSerial, lMaxParallel)
          ' Get the port name and do some checking . . .
          iError = EngCmd.KamPortGetName(iComPort, strCom)
          SetError (iError)
          If (iComPort > lMaxSerial) Then MsgBox ("Com port
                    our of range")
          iError =
                    EngCmd.KamMiscGetControllerName(iController,
                    strCntrl)
               If (iLogicalPort > lMaxLogical) Then MsgBox
("Logical port out of range")
                    SetError (iError)
          End If
               'Display values in Throttle . . .
               LogPort.Caption = iLogicalPort
               ComPort.Caption = strCom
               Controller.Caption = strCntrl
End Sub
'*************************************
'Send Command
'Note:
'              Please follow the command order. Order is important
'              for the application to work!
'*************************************
Private Sub Command_Click()
               'Send the command from the interface to the command
               station, use the engineObject
               Dim iError, iSpeed As Integer
               If Not Connect.Enabled Then
                    'TrainTools interface is a caching interface.
                    'This means that you need to set up the CV's or
                    'other operations first; then execute the
                    'command.
                    iSpeed = Speed.Text
                    iError =
               EngCmd.KamEngPutFunction(lEngineObject, 0, F0.Value)
                    iError =
                    EngCmd.KamEngPutFunction(lEngineObject, 1,
                    F1.Value)
                    iError =
                    EngCmd.KamEngPutFunction(lEngineObject, 2,
                    F2.Value)
                    iError =
                    EngCmd.KamEngPutFunction(lEngineObject, 3,
                    F3.Value)
```

-continued

```
                    iError = EngCmd.KamEngPutSpeed(lEngineObject,
                    iSpeed, Direction.Value)
                    If iError = 0 Then iError =
                    EngCmd.KamCmdCommand(lEngineObject)
                    SetError (iError)
                End If
End Sub
'*************************************
'Connect Controller
'*************************************
Private Sub Connect_Click()
            Dim iError As Integer
            'These are the index values for setting up the port
for use
            ' PORT_RETRANS           0 // Retrans index
            ' PORT_RATE              1 // Retrans index
            ' PORT_PARITY            2 // Retrans index
            ' PORT_STOP              3 // Retrans index
            ' PORT_WATCHDOG          4 // Retrans index
            ' PORT_FLOW              5 // Retrans index
            ' PORT_DATABITS          6 // Retrans index
            ' PORT_DEBUG             7 // Retrans index
            ' PORT_PARALLEL          8 // Retrans index
                    'These are the index values for setting up the
                    port for use
            ' PORT_RETRANS           0 // Retrans index
            ' PORT_RATE              1 // Retrans index
            ' PORT_PARITY            2 // Retrans index
            ' PORT_STOP              3 // Retrans index
            ' PORT_WATCHDOG          4 // Retrans index
            ' PORT_FLOW              5 // Retrans index
            ' PORT_DATABITS          6 // Retrans index
            ' PORT_DEBUG             7 // Retrans index
            ' PORT_PARALLEL          8 // Retrans index
            iError = EngCmd.KamPortPutConfig(iLogicalPort, 0,
            iPortRetrans, 0) ' setting PORT_RETRANS
            iError = EngCmd.KamPortPutConfig(iLogicalPort, 1,
            iPortRate, 0) ' setting PORT_RATE
            iError = EngCmd.KamPortPutConfig(iLogicalPort, 2,
            iPortParity, 0) ' setting PORT_PARITY
            iError = EngCmd.KamPortPutConfig(iLogicalPort, 3,
            iPortStop, 0) ' setting PORT_STOP
            iError = EngCmd.KamPortPutConfig(iLogicalPort, 4,
            iPortWatchdog, 0) ' setting PORT_WATCHDOG
            iError = EngCmd.KamPortPutConfig(iLogicalPort, 5,
            iPortFlow, 0) ' setting PORT_FLOW
            iError = EngCmd.KamPortPutConfig(iLogicalPort, 6,
            iPortData, 0) ' setting PORT_DATABITS
'     We need to set the appropriate debug mode for display..
'     this command can only be sent if the following is true
'     -Controller is not connected
'     -port has not been mapped
'     -Not share ware version of application (Shareware
'             always set to 130)
'     Write Display     Log     Debug
'     File    Win     Level     Value
'     1 + 2 + 4 = 7 —> LEVEL1 -- put packets into
'             queues
'     1 + 2 + 8 = 11 —> LEVEL2 -- Status messages
'             send to window
'     1 + 2 + 16 = 19 —> LEVEL3 --
'     1 + 2 + 32 = 35 —> LEVEL4 -- All system
'             semaphores/critical sections
'     1 + 2 + 64 = 67 —> LEVEL5 -- detailed
'             debugging information
'     1 + 2 + 128 = 131 —> COMMONLY -- Read comm write
'             comm ports
'
'You probably only want to use values of 130. This will
'give you a display what is read or written to the
'controller. If you want to write the information to
'disk, use 131. The other information is not valid for
'end users.
'     Note:   1.      This does effect the performance of you
'                     system; 130 is a save value for debug
'                     display. Always set the key to 1, a value
'                     of 0 will disable debug
'             2.      The Digitrax control codes displayed are
'                     encrypted. The information that you
```

-continued

```
'                    determine from the control codes is that
'                    information is sent (S) and a response is
'                    received (R)
'
iDebugMode = 130
iValue = Value.Text' Display value for reference
iError = EngCmd.KamPortPutConfig(iLogicalPort, 7, iDebug,
            iValue)' setting PORT__DEBUG
'Now map the Logical Port, Physical device, Command
        station and Controller
iError = EngCmd.KamPortPutMapController(iLogicalPort,
            iController, iComPort)
iError = EngCmd.KamCmdConnect(iLogicalPort)
iError = EngCmd.KamOprPutTurnOnStation(iLogicalPort)
If (iError) Then
        SetButtonState (False)
    Else
        SetButtonState (True)
    End If
SetError (iError) 'Displays the error message and error
        number
End Sub
'**************************************
'Set the address button
'**************************************
Private Sub DCCAddr__Click()
        Dim iAddr, iStatus As Integer
        ' All addresses must be match to a logical port to
        operate
        iDecoderType = 1        ' Set the decoder type to an NMRA
            baseline decoder ( 1 - 8 reg)
        iDecoderClass = 1       ' Set the decoder class to Engine
        decoder (there are only two classes of decoders;
        Engine and Accessory
        'Once we make a connection, we use the lEngineObject
        'as the reference object to send control information
        If (Address.Text > 1) Then
            iStatus = EngCmd.KamDecoderPutAdd(Address.Text,
                iLogicalPort, iLogicalPort, 0,
                iDecoderType, lEngineObject)
        SetError (iStatus)
        If (lEngineObject) Then
                Command.Enabled = True 'turn on the control
                (send) button
                Throttle.Enabled = True ' Turn on the throttle
            Else
                MsgBox ("Address not set, check error message")
                End If
        Else
                MsgBox ("Address must be greater then 0 and
                    less then 128")
                End If
End Sub
'**************************************
'Disconenct button
'**************************************
Private Sub Disconnect__Click()
        Dim iError As Integer
        iError = EngCmd.KamCmdDisConnect(iLogicalPort)
        SetError (iError)
        SetButtonState (False)
End Sub
'**************************************
'Display error message
'**************************************
Private Sub SetError(iError As Integer)
        Dim szError As String
        Dim iStatus
        ' This shows how to retrieve a sample error message
        from the interface for the status received.
        iStatus = EngCmd.KamMiscGetErrorMsg(iError, szError)
        ErrorMsg.Caption = szError
        Result.Caption = Str(iStatus)
End Sub
'**************************************
'Set the Form button state
'**************************************
Private Sub SetButtonState(iState As Boolean)
        'We set the state of the buttons; either connected
```

-continued

```
        or disconnected
        If (iState) Then
            Connect.Enabled = False
            Disconnect.Enabled = True
            ONCmd.Enabled = True
            OffCmd.Enabled = True
            DCCAddr.Enabled = True
            UpDownAddress.Enabled = True
        'Now we check to see if the Engine Address has been
        'set; if it has we enable the send button
        If (lEngineObject > 0) Then
            Command.Enabled = True
            Throttle.Enabled = True
            Else
                Command.Enabled = False
                Throttle.Enabled = False
            End If
        Else
                Connect.Enabled = True
                Disconnect.Enabled = False
                Command.Enabled = False
                ONCmd.Enabled = False
                OffCmd.Enabled = False
                DCCAddr.Enabled = False
                UpDownAddress.Enabled = False
                Throttle.Enabled = False
                End If
End Sub
'**************************************
'Power Off function
'**************************************
Private Sub OffCmd_Click()
        Dim iError As Integer
        iError = EngCmd.KamOprPutPowerOff(iLogicalPort)
        SetError (iError)
End Sub
'**************************************
'Power On function
'**************************************
Private Sub ONCmd_Click()
        Dim iError As Integer
        iError = EngCmd.KamOprPutPowerOn(iLogicalPort)
        SetError (iError)
End Sub
'**************************************
'Throttle slider control
'**************************************
Private Sub Throttle_Click()
        If (lEngineObject) Then
                If (Throttle.Value > 0) Then
                    Speed.Text = Throttle.Value
                    End If
                End If
End Sub
```

I. IDL COMMAND REFERENCE

A. Introduction

This document describes the IDL interface to the KAM Industries Engine Commander Train Server. The Train Server DCOM server may reside locally or on a network node This server handles all the background details of controlling your railroad. You write simple, front end programs in a variety of languages such as BASIC, Java, or C++ to provide the visual interface to the user while the server handles the details of communicating with the command station, etc.

A. Data Types

Data is passed to and from the IDL interface using a several primitive data types. Arrays of these simple types are also used. The exact type passed to and from your program depends on the programming language your are using.

The following primitive data types are used:

| IDL Type | BASIC Type | C++ Type | Java Type | Description |
|---|---|---|---|---|
| short | short | short | short | Short signed integer |
| int | int | int | int | Signed integer |
| BSTR | BSTR | BSTR | BSTR | Text string |
| long | long | long | long | Unsigned 32 bit value |

Name ID CV Range Valid CV's Functions Address Range Speed Steps

-continued

NMRA Compatible 0 None None 2 1–99 14
Baseline 1 1–8 1–8 9 1–127 14
Extended 2 1–106 1–9, 17, 18, 19, 23, 24, 29, 30, 49, 66–95 9 1–10239 14,28,128
All Mobile 3 1–106 1–106 9 1–10239 14,28,128

| Name | ID | CV Range | Valid CV's | Functions | Address Range |
|---|---|---|---|---|---|
| Accessory | 4 | 513–593 | 513–593 | 8 | 0–511 |
| All Stationary | 5 | 513–1024 | 513–1024 | 8 | 0–511 |

A long /DecoderObject/D value is returned by the KamDecoderPutAdd call if the decoder is successfully registered with the server. This unique opaque ID should be used for all subsequent calls to reference this decoder.

A. Commands to access the server configuration variable database

This section describes the commands that access the server configuration variables (CV) database. These CVs are stored in the decoder and control many of its characteristics such as its address. For efficiency, a copy of each CV value is also stored in the server database. Commands such as KamCVGetValue and KamCVPutValue communicate only with the server, not the actual decoder. You then use the programming commands in the next section to transfer CVs to and from the decoder.

0KamCVGetValue

| Parameter List | Type | Range | Direction | Description |
|---|---|---|---|---|
| lDecoderObjectID | long | 1 | In | Decoder object ID |
| iCVReg | int | 1–1024 2 | In | CV register |
| pCVValue | int * | 3 | Out | Pointer to CV value |

1 Opaque object ID handle returned by KamDecoderPutAdd.
2 Range is 1–1024. Maximum CV for this decoder is given by KamCVGetMaxRegister.
3 CV Value pointed to has a range of 0 to 255.

| Return Value | Type | Range | Description |
|---|---|---|---|
| iError | short | 1 | Error flag |

1 iError = 0 for success. Nonzero is an error number (see KamMiscGetErrorMsg). KamCVGetValue takes the decoder object ID and configuration variable (CV) number as parameters. It sets the memory pointed to by pCVValue to the value of the server copy of the configuration variable.

0KamCVPutValue

| Parameter List | Type | Range | Direction | Description |
|---|---|---|---|---|
| lDecoderObjectID | long | 1 | In | Decoder object ID |
| iCVReg | int | 1–1024 2 | In | CV register |
| iCVValue | int | 0–255 | In | CV value |

1 Opaque object ID handle returned by KamDecoderPutAdd.
2 Maximum CV is 1024. Maximum CV for this decoder is given by KamCVGetMaxRegister.

| Return Value | Type | Range | Description |
|---|---|---|---|
| iError | short | 1 | Error flag |

1 iError = 0 for success. Nonzero is an error number (see KamMiscGetErrorMsg).
KamCVPutValue takes the decoder object ID, configuration variable (CV) number, and a new CV value as parameters. It sets the server copy of the specified decoder CV to iCVValue.

0KamCVGetEnable

| Parameter List | Type | Range | Direction | Description |
|---|---|---|---|---|
| lDecoderObjectID | long | 1 | In | Decoder object ID |
| iCVReg | int | 1–1024 2 | In | CV number |
| pEnable | int * | 3 | Out | Pointer to CV bit mask |

1 Opaque object ID handle returned by KamDecoderPutAdd.
2 Maximum CV is 1024. Maximum CV for this decoder is given by KamCVGetMaxRegister.
3 0x0001 - SET_CV_INUSE 0x0002 - SET_CV_READ_DIRTY
0x0004 - SET_CV_WRITE_DIRTY 0x0008 - SET_CV_ERROR_READ
0x0010 - SET_CV_ERROR_WRITE

| Return Value | Type | Range | Description |
|---|---|---|---|
| iError | short | 1 | Error flag |

1 iError = 0 for success. Nonzero is an error number (see KamMiscGetErrorMsg). KamCVGetEnable takes the decoder object ID, configuration variable (CV) number, and a pointer to store the enable flag as parameters. It sets the location pointed to by pEnable.

-continued

0KamCVPutEnable
Parameter List Type Range Direction Description
lDecoderObjectID long 1 In Decoder object ID
iCVRegint 1–1024 2 In CV number
iEnableint 3 In CV bit mask
1 Opaque object ID handle returned by KamDecoderPutAdd.
2 Maximum CV is 1024. Maximum CV for this decoder is given by KamCVGetMaxRegister.
3 0x0001 - SET_CV_INUSE 0x0002 - SET_CV_READ_DIRTY
0x0004 - SET_CV_WRITE_DIRTY 0x0008 - SET_CV_ERROR_READ
0x0010 - SET_CV_ERROR_WRITE
Return Value Type Range Description
iError short 1 Error flag
1 iError = 0 for success. Nonzero is an error number (see KamMiscGetErrorMsg).
KamCVPutEnable takes the decoder object ID, configuration variable (CV) number, and a new enable state as parameters. It sets the server copy of the CV bit mask to iEnable.
0KamCVGetName
Parameter List Type Range Direction Description
iCV int 1–1024 In CV number
pbsCVNameString BSTR * 1 Out Pointer to CV name string
1 Exact return type depends on language. It is Cstring * for C++. Empty string on error.
Return Value Type Range Description
iError short 1 Error flag
1 iError = 0 for success. Nonzero is an error number (see KamMiscGetErrorMsg).
KamCVGetName takes a configuration variable (CV) number as a parameter. It sets the memory pointed to by pbsCVNameString to the name of the CV as defined in NMRA Recommended Practice RP 9.2.2.
0KamCVGetMinRegister
Parameter List Type Range Direction Description
lDecoderObjectID long 1 In Decoder object ID
pMinRegister int * 2 Out Pointer to min CV register number
1 Opaque object ID handle returned by KamDecoderPutAdd.
2 Normally 1–1024. 0 on error or if decoder does not support CVs.
Return Value Type Range Description
iError short 1 Error flag
1 iError = 0 for success. Nonzero is an error number (see KamMiscGetErrorMsg).
KamCVGetMinRegister takes a decoder object ID as a parameter. It sets the memory pointed to by pMinRegister to the minimum possible CV register number for the specified decoder.
0KamCVGetMaxRegister
Parameter List Type Range Direction Description
lDecoderObjectID long 1 In Decoder object ID
pMaxRegister int * 2 Out Pointer to max CV register number
1 Opaque object ID handle returned by KamDecoderPutAdd.
2 Normally 1–1024. 0 on error or if decoder does not support CVs.
Return Value Type Range Description
iError short 1 Error flag
1 iError = 0 for success. Nonzero is an error number (see KamMiscGetErrorMsg).
KamCVGetMaxRegister takes a decoder object ID as a parameter. It sets the memory pointed to by pMaxRegister to the maximum possible CV register number for the specified decoder.
A. Commands to program configuration variables This section describes the commands read and write decoder configuration variables (CVs). You should initially transfer a copy of the decoder CVs to the server using the KamProgramReadDecoderToDataBase command. You can then read and modify this server copy of the CVs. Finally, you can program one or more CVs into the decoder using the KamProgramCV or KamProgramDecoderFromDataBase command. Not that you must first enter programming mode -continued by issuing the KamProgram command before any programming can be done.

0KamProgram

| Parameter List | Type | Range | Direction | | Description |
|---|---|---|---|---|---|
| lDecoderObjectID | | long | 1 | In | Decoder object ID |
| iProgLogPort | int | 1–65535 | 2 | In | Logical programming port ID |
| iProgMode int | | 3 | In | | Programming mode |

1 Opaque object ID handle returned by KamDecoderPutAdd.
2 Maximum value for this server given by KamPortGetMaxLogPorts.
3 0 - PROGRAM_MODE_NONE
1 - PROGRAM_MODE_ADDRESS 2 - PROGRAM_MODE_REGISTER
3 - PROGRAM_MODE_PAGE
4 - PROGRAM_MODE_DIRECT
5 - DCODE_PRGMODE_OPS_SHORT
6 - PROGRAM_MODE_OPS_LONG

| Return Value | Type | Range | Description |
|---|---|---|---|
| iError short | 1 | Error flag | |

1 iError = 0 for success. Nonzero is an error number (see KamMiscGetErrorMsg).

KamProgram take the decoder object ID, logical programming port ID, and programming mode as parameters. It changes the command station mode from normal operation (PROGRAM_MODE_NONE) to the specified programming mode. Once in programming modes, any number of programming commands may be called. When done, you must call KamProgram with a parameter of PROGRAM_MODE_NONE to return to normal operation.

0KamProgramGetMode

| Parameter List | Type | Range | Direction | | Description |
|---|---|---|---|---|---|
| lDecoderObjectID | | long | 1 | In | Decoder object ID |
| iProgLogPort | int | 1–65535 | 2 | In | Logical programming port ID |
| piProgMode | int * 3 | | Out | | Programming mode |

1 Opaque object ID handle returned by KamDecoderPutAdd.
2 Maximum value for this server given by KamPortGetMaxLogPorts.
3 0 - PROGRAM_MODE_NONE
1 - PROGRAM_MODE_ADDRESS 2 - PROGRAM_MODE_REGISTER
3 - PROGRAM_MODE_PAGE
4 - PROGRAM_MODE_DIRECT
5 - DCODE_PRGMODE_OPS_SHORT
6 - PROGRAM_MODE_OPS_LONG

| Return Value | Type | Range | Description |
|---|---|---|---|
| iError short | 1 | Error flag | |

1 iError = 0 for success. Nonzero is an error number (see KamMiscGetErrorMsg).

KamProgramGetMode take the decoder object ID, logical programming port ID, and pointer to a place to store the programming mode as parameters. It sets the memory pointed to by piProgMode to the present programming mode.

0KamProgramGetStatus

| Parameter List | Type | Range | Direction | | Description |
|---|---|---|---|---|---|
| lDecoderObjectID | | long | 1 | In | Decoder object ID |
| iCVRegint | 0–1024 | 2 | In | | CV number |
| piCVAllStatus | int * 3 | Out | | | Or'd decoder programming status |

1 Opaque object ID handle returned by KamDecoderPutAdd.
2 0 returns OR'd value for all CVs. Other values return status for just that CV.
3 0x0001 - SET_CV_INUSE
0x0002 - SET_CV_READ_DIRTY
0x0004 - SET_CV_WRITE_DIRTY
0x0008 - SET_CV_ERROR_READ
0x0010 - SET_CV_ERROR_WRITE

| Return Value | Type | Range | Description |
|---|---|---|---|
| iError short | 1 | Error flag | |

1 iError = 0 for success. Nonzero is an error number (see KamMiscGetErrorMsg).

KamProgramGetStatus take the decoder object ID and pointer to a place to store the OR'd decoder programming -continued status as parameters. It sets the memory pointed to by piProgMode to the present programming mode.

0KamProgramReadCV

| Parameter List | Type | Range | Direction | Description |
|---|---|---|---|---|
| lDecoderObjectID | long | 1 | In | Decoder object ID |
| iCVRegint | 2 | In | CV number | |

1 Opaque object ID handle returned by KamDecoderPutAdd.

2 Maximum CV is 1024. Maximum CV for this decoder is given by KamCVGetMaxRegister.

| Return Value | Type | Range | Description |
|---|---|---|---|
| iError short | 1 | Error flag | |

1 iError = 0 for success. Nonzero is an error number (see KamMiscGetErrorMsg).

KamProgramCV takes the decoder object ID, configuration variable (CV) number as parameters. It reads the specified CV variable value to the server database.

0KamProgramCV

| Parameter List | Type | Range | Direction | Description |
|---|---|---|---|---|
| lDecoderObjectID | long | 1 | In | Decoder object ID |
| iCVRegint | 2 | In | CV number | |
| iCVValue | int | 0–255 | In | CV value |

1 Opaque object ID handle returned by KamDecoderPutAdd.

2 Maximum CV is 1024. Maximum CV for this decoder is given by KamCVGetMaxRegister.

| Return Value | Type | Range | Description |
|---|---|---|---|
| iError short | 1 | Error flag | |

1 iError = 0 for success. Nonzero is an error number (see KamMiscGetErrorMsg).

KamProgramCV takes the decoder object ID, configuration variable (CV) number, and a new CV value as parameters. It programs (writes) a single decoder CV using the specified value as source data.

0KamProgramReadDecoderToDataBase

| Parameter List | Type | Range | Direction | Description |
|---|---|---|---|---|
| lDecoderObjectID | long | 1 | In | Decoder object ID |

1 Opaque object ID handle returned by KamDecoderPutAdd.

| Return Value | Type | Range | Description |
|---|---|---|---|
| iError short | 1 | Error flag | |

1 iError = 0 for success. Nonzero is an error number (see KamMiscGetErrorMsg).

KamProgramReadDecoderToDataBase takes the decoder object ID as a parameter. It reads all enabled CV values from the decoder and stores them in the server database.

0KamProgramDecoderFromDataBase

| Parameter List | Type | Range | Direction | Description |
|---|---|---|---|---|
| lDecoderObjectID | long | 1 | In | Decoder object ID |

1 Opaque object ID handle returned by KamDecoderPutAdd.

| Return Value | Type | Range | Description |
|---|---|---|---|
| iError short | 1 | Error flag | |

1 iError = 0 for success. Nonzero is an error number (see KamMiscGetErrorMsg).

KamProgramDecoderFromDataBase takes the decoder object ID as a parameter. It programs (writes) all enabled decoder CV values using the server copy of the CVs as source data.

A. Commands to control all decoder types

This section describes the commands that all decoder types. These commands do things such getting the maximum address a given type of decoder supports, adding decoders to the database, etc.

0KamDecoderGetMaxModels

| Parameter List | Type | Range | Direction | Description |
|---|---|---|---|---|
| piMaxModels | int * 1 | | Out | Pointer to Max model ID |

1 Normally 1–65535. 0 on error.

| Return Value | Type | Range | Description |
|---|---|---|---|
| iError short | 1 | Error flag | |

1 iError = 0 for success. Nonzero is an error number (see KamMiscGetErrorMsg).

KamDecoderGetMaxModels takes no parameters. It sets the memory pointed to by piMaxModels to the maximum decoder type ID.

0KamDecoderGetModelName

| Parameter List | Type | Range | Direction | Description |
|---|---|---|---|---|
| iModel int 1–65535 | 1 | | In | Decoder type ID |

-continued pbsModelName BSTR * 2 Out Decoder name string
1 Maximum value for this server given by KamDecoderGetMaxModels.
2 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number (see KamMiscGetErrorMsg). KamPortGetModelName takes a decoder type ID and a pointer to a string as parameters. It sets the memory pointed to by pbsModelName to a BSTR containing the decoder name.

0KamDecoderSetModelToObj

| Parameter List | Type | Range | Direction | Description |
|---|---|---|---|---|
| iModel | int | 1 | In | Decoder model ID |
| lDecoderObjectID | long | 1 | In | Decoder object ID |

1 Maximum value for this server given by KamDecoderGetMaxModels.
2 Opaque object ID handle returned by KamDecoderPutAdd.

| Return Value | Type | Range | Description |
|---|---|---|---|
| iError | short | 1 | Error flag |

1 iError = 0 for success. Nonzero is an error number (see KamMiscGetErrorMsg).
KamDecoderSetModelToObj takes a decoder ID and decoder object ID as parameters. It sets the decoder model type of the decoder at address lDecoderObjectID to the type specified by iModel.

0KamDecoderGetMaxAddress

| Parameter List | Type | Range | Direction | Description |
|---|---|---|---|---|
| iModel | int | 1 | In | Decoder type ID |
| piMaxAddress | int * | 2 | Out | Maximum decoder address |

1 Maximum value for this server given by KamDecoderGetMaxModels.
2 Model dependent. 0 returned on error.

| Return Value | Type | Range | Description |
|---|---|---|---|
| iError | short | 1 | Error flag |

1 iError = 0 for success. Nonzero is an error number (see KamMiscGetErrorMsg).
KamDecoderGetMaxAddress takes a decoder type ID and a pointer to store the maximum address as parameters. It sets the memory pointed to by piMaxAddress to the maximum address supported by the specified decoder.

0KamDecoderChangeOldNewAddr

| Parameter List | Type | Range | Direction | Description |
|---|---|---|---|---|
| lOldObjID | long | 1 | In | Old decoder object ID |
| iNewAddr | int | 2 | In | New decoder address |
| plNewObjID | long * | 1 | Out | New decoder object ID |

1 Opaque object ID handle returned by KamDecoderPutAdd.
2 1–127 for short locomotive addresses. 1–10239 for long locomotive decoders. 0–511 for accessory decoders.

| Return Value | Type | Range | Description |
|---|---|---|---|
| iError | short | 1 | Error flag |

1 iError = 0 for success. Nonzero is an error number (see KamMiscGetErrorMsg).
KamDecoderChangeOldNewAddr takes an old decoder object ID and a new decoder address as parameters. It moves the specified locomotive or accessory decoder to iNewAddr and sets the memory pointed to by plNewObjID to the new object ID. The old object ID is now invalid and should no longer be used.

0KamDecoderMovePort

| Parameter List | Type | Range | Direction | Description |
|---|---|---|---|---|
| lDecoderObjectID | long | 1 | In | Decoder object ID |
| iLogicalPortID | int | 1–65535 2 | In | Logical port ID |

1 Opaque object ID handle returned by KamDecoderPutAdd.
2 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).
KamDecoderMovePort takes a decoder object ID and logical port ID as parameters. It moves the decoder specified by lDecoderObjectID to the controller specified by -continued iLogicalPortID.
0KamDecoderGetPort

| Parameter List | Type | Range | Direction | Description |
|---|---|---|---|---|
| lDecoderObjectID | long | 1 | In | Decoder object ID |
| piLogicalPortID | int * | 1–65535 2 | Out | Pointer to logical port ID |

1 Opaque object ID handle returned by KamDecoderPutAdd.
2 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).
KamDecoderMovePort takes a decoder object ID and pointer to a logical port ID as parameters. It sets the memory pointed to by piLogicalPortID to the logical port ID associated with lDecoderObjectID.
0KamDecoderCheckAddrInUse

| Parameter List | Type | Range | Direction | Description |
|---|---|---|---|---|
| iDecoderAddress | int | 1 | In | Decoder address |
| iLogicalPortID | int | 2 | In | Logical Port ID |
| iDecoderClass | int | 3 | In | Class of decoder |

1 Opaque object ID handle returned by KamDecoderPutAdd.
2 Maximum value for this server given by KamPortGetMaxLogPorts.
3 1 - DECODER_ENGINE_TYPE,
2 - DECODER_SWITCH_TYPE,
3 - DECODER_SENSOR_TYPE.

| Return Value | Type | Range | Description |
|---|---|---|---|
| iError | short | 1 | Error flag |

1 iError = 0 for successful call and address not in use. Nonzero is an error number (see KamMiscGetErrorMsg). IDS_ERR_ADDRESSEXIST returned if call succeeded but the address exists.
KamDecoderCheckAddrInUse takes a decoder address, logical port, and decoder class as parameters. It returns zero if the address is not in use. It will return IDS_ERR_ADDRESSEXIST if the call succeeds but the address already exists. It will return the appropriate non zero error number if the calls fails.
0KamDecoderGetModelFromObj

| Parameter List | Type | Range | Direction | Description |
|---|---|---|---|---|
| lDecoderObjectID | long | 1 | In | Decoder object ID |
| piModel | int * | 1–65535 2 | Out | Pointer to decoder type ID |

1 Opaque object ID handle returned by KamDecoderPutAdd.
2 Maximum value for this server given by KamDecoderGetMaxModels.

| Return Value | Type | Range | Description |
|---|---|---|---|
| iError | short | 1 | Error flag |

1 iError = 0 for success. Nonzero is an error number (see KamMiscGetErrorMsg).
KamDecoderGetModelFromObj takes a decoder object ID and pointer to a decoder type ID as parameters. It sets the memory pointed to by piModel to the decoder type ID associated with iDCCAddr.
0KamDecoderGetModelFacility

| Parameter List | Type | Range | Direction | Description |
|---|---|---|---|---|
| lDecoderObjectID | long | 1 | In | Decoder object ID |
| pdwFacility | long * | 2 | Out | Pointer to decoder facility mask |

1 Opaque object ID handle returned by KamDecoderPutAdd.
2 0 - DCODE_PRGMODE_ADDR
1 - DCODE_PRGMODE_REG
2 - DCODE_PRGMODE_PAGE
3 - DCODE_PRGMODE_DIR
4 - DCODE_PRGMODE_FLYSHT
5 - DCODE_PRGMODE_FLYLNG
6 - Reserved
7 - Reserved
8 - Reserved
9 - Reserved
10 - Reserved
11 - Reserved
12 - Reserved -continued 13 - DCODE_FEAT_DIRLIGHT
14 - DCODE_FEAT_LNGADDR
15 - DCODE_FEAT_CVENABLE
16 - DCODE_FEDMODE_ADDR
17 - DCODE_FEDMODE_REG
18 - DCODE_FEDMODE_PAGE
19 - DCODE_FEDMODE_DIR
20 - DCODE_FEDMODE_FLYSHT
21 - DCODE_FEDMODE_FLYLNG

| Return Value | Type | Range | Description |
|---|---|---|---|
| iError short | 1 | Error flag | |

1 iError = 0 for success. Nonzero is an error number (see KamMiscGetErrorMsg).

KamDecoderGetModelFacility takes a decoder object ID and pointer to a decoder facility mask as parameters. It sets the memory pointed to by pdwFacility to the decoder facility mask associated with iDCCAddr.

0KamDecoderGetObjCount

| Parameter List | Type | Range | Direction | Description |
|---|---|---|---|---|
| iDecoderClass | int | 1 | In | Class of decoder |
| piObjCount | int * | 0–65535 | Out | Count of active decoders |

1 1 - DECODER_ENGINE_TYPE,
2 - DECODER_SWITCH_TYPE,
3 - DECODER_SENSOR_TYPE.

| Return Value | Type | Range | Description• |
|---|---|---|---|
| iError short | 1 | Error flag | |

1 iError = 0 for success. Nonzero is an error number (see KamMiscGetErrorMsg).

KamDecoderGetObjCount takes a decoder class and a pointer to an address count as parameters. It sets the memory pointed to by piObjCount to the count of active decoders of the type given by iDecoderClass.

0KamDecoderGetObjAtIndex

| Parameter List | Type | Range | Direction | Description• |
|---|---|---|---|---|
| iIndex int | 1 | In | Decoder array index | |
| iDecoderClass | int | 2 | In | Class of decoder |
| plDecoderObjectID | long * 3 | Out | Pointer to decoder object ID | |

1 0 to (KamDecoderGetAddressCount - 1).
2 1 - DECODER_ENGINE_TYPE,
2 - DECODER_SWITCH_TYPE,
3 - DECODER_SENSOR_TYPE.
3 Opaque object ID handle returned by KamDecoderPutAdd.

| Return Value | Type | Range | Description |
|---|---|---|---|
| iError short | 1 | Error flag | |

1 iError = 0 for success. Nonzero is an error number (see KamMiscGetErrorMsg).

KamDecoderGetObjCount takes a decoder index, decoder class, and a pointer to an object ID as parameters. It sets the memory pointed to by plDecoderObjectID to the selected object ID.

0KamDecoderPutAdd

| Parameter List | Type | Range | Direction | Description |
|---|---|---|---|---|
| iDecoderAddress | int | 1 | In | Decoder address |
| iLogicalCmdPortID | int | 1–65535 2 | In | Logical command port ID |
| iLogicalProgPortID | int | 1–65535 2 | In | Logical programming port ID |
| iClearState | int | 3 | In | Clear state flag |
| iModel int | 4 | In | Decoder model type ID | |
| plDecoderObjectID | long * 5 | Out | Decoder object ID | |

1 1–127 for short locomotive addresses. 1–10239 for long locomotive decoders. 0–511 for accessory decoders.
2 Maximum value for this server given by KamPortGetMaxLogPorts.
3 0 - retain state, 1 - clear state.
4 Maximum value for this server given by KamDecoderGetMaxModels.
5 Opaque object ID handle. The object ID is used to reference the decoder.

| Return Value | Type | Range | Description |
|---|---|---|---|
| iError short | 1 | Error flag | |

1 iError = 0 for success. Nonzero is an error number (see KamMiscGetErrorMsg).

-continued

KamDecoderPutAdd takes a decoder object ID, command logical port, programming logical port, clear flag, decoder model ID, and a pointer to a decoder object ID as parameters. It creates a new locomotive object in the locomotive database and sets the memory pointed to by plDecoderObjectID to the decoder object ID used by the server as a key.

0KamDecoderPutDel

| Parameter List | Type | Range | Direction | Description |
|---|---|---|---|---|
| lDecoderObjectID | long | 1 | In | Decoder object ID |
| iClearState | int | 2 | In | Clear state flag |

1 Opaque object ID handle returned by KamDecoderPutAdd.
2 0 - retain state, 1 - clear state.

| Return Value | Type | Range | Description• |
|---|---|---|---|
| iError | short | 1 | Error flag |

1 iError = 0 for success. Nonzero is an error number (see KamMiscGetErrorMsg).

KamDecoderPutDel takes a decoder object ID and clear flag as parameters. It deletes the locomotive object specified by lDecoderObjectID from the locomotive database.

0KamDecoderGetMfgName

| Parameter List | Type | Range | Direction | Description |
|---|---|---|---|---|
| lDecoderObjectID | long | 1 | In | Decoder object ID |
| pbsMfgName | BSTR * | 2 | Out | Pointer to manufacturer name |

1 Opaque object ID handle returned by KamDecoderPutAdd.
2 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number (see KamMiscGetErrorMsg).

KamDecoderGetMfgName takes a decoder object ID and pointer to a manufacturer name string as parameters. It sets the memory pointed to by pbsMfgName to the name of the decoder manufacturer.

0KamDecoderGetPowerMode

| Parameter List | Type | Range | Direction | Description |
|---|---|---|---|---|
| lDecoderObjectID | long | 1 | In | Decoder object ID |
| pbsPowerMode | BSTR * | 2 | Out | Pointer to decoder power mode |

1 Opaque object ID handle returned by KamDecoderPutAdd.
2 Exact return type depends on language. It is Cstring * for C++. Empty string on error.

| Return Value | Type | Range | Description• |
|---|---|---|---|
| iError | short | 1 | Error flag |

1 iError = 0 for success. Nonzero is an error number (see KamMiscGetErrorMsg).

KamDecoderGetPowerMode takes a decoder object ID and a pointer to the power mode string as parameters. It sets the memory pointed to by pbsPowerMode to the decoder power mode.

0KamDecoderGetMaxSpeed

| Parameter List | Type | Range | Direction | Description |
|---|---|---|---|---|
| lDecoderObjectID | long | 1 | In | Decoder object ID |
| piSpeedStep | int * | 2 | Out | Pointer to max speed step |

1 Opaque object ID handle returned by KamDecoderPutAdd.
2 14, 28, 56, or 128 for locomotive decoders. 0 for accessory decoders.

| Return Value | Type | Range | Description |
|---|---|---|---|
| iError | short | 1 | Error flag |

1 iError = 0 for success. Nonzero is an error number (see KamMiscGetErrorMsg).

KamDecoderGetMaxSpeed takes a decoder object ID and a pointer to the maximum supported speed step as parameters. It sets the memory pointed to by piSpeedStep to the maximum speed step supported by the decoder.

A. Commands to control locomotive decoders

This section describes the commands that control locomotive decoders. These commands control things such as locomotive speed and direction. For efficiency, a copy of all the engine variables such speed is stored in the server. Commands such as KamEngGetSpeed -continued communicate only with the server, not the actual decoder. You should first make any changes to the server copy of the engine variables. You can send all changes to the engine using the KamCmdCommand command.

0KamEngGetSpeed

| Parameter List | Type | Range | Direction | Description |
|---|---|---|---|---|
| lDecoderObjectID | long | 1 | In | Decoder object ID |
| lpSpeed | int * | 2 | Out | Pointer to locomotive speed |
| lpDirection | int * | 3 | Out | Pointer to locomotive direction |

1 Opaque object ID handle returned by KamDecoderPutAdd.
2 Speed range is dependent on whether the decoder is set to 14, 18, or 128 speed steps and matches the values defined by NMRA S9.2 and RP 9.2.1. 0 is stop and 1 is emergency stop for all modes.
3 Forward is boolean TRUE and reverse is boolean FALSE.

| Return Value | Type | Range | Description |
|---|---|---|---|
| iError | short | 1 | Error flag |

1 iError = 0 for success. Nonzero is an error number (see KamMiscGetErrorMsg).

KamEngGetSpeed takes the decoder object ID and pointers to locations to store the locomotive speed and direction as parameters. It sets the memory pointed to by lpSpeed to the locomotive speed and the memory pointed to by lpDirection to the locomotive direction.

0KamEngPutSpeed

| Parameter List | Type | Range | Direction | Description• |
|---|---|---|---|---|
| lDecoderObjectID | long | 1 | In | Decoder object ID |
| iSpeed | int | 2 | In | Locomotive speed |
| iDirection | int | 3 | In | Locomotive direction |

1 Opaque object ID handle returned by KamDecoderPutAdd.
2 Speed range is dependent on whether the decoder is set to 14, 18, or 128 speed steps and matches the values defined by NMRA S9.2 and RP 9.2.1. 0 is stop and 1 is emergency stop for all modes.
3 Forward is boolean TRUE and reverse is boolean FALSE.

| Return Value | Type | Range | Description |
|---|---|---|---|
| iError | short | 1 | Error flag |

1 iError = 0 for success. Nonzero is an error number (see KamMiscGetErrorMsg).

KamEngPutSpeed takes the decoder object ID, new locomotive speed, and new locomotive direction as parameters. It sets the locomotive database speed to iSpeed and the locomotive database direction to iDirection. Note: This command only changes the locomotive database. The data is not sent to the decoder until execution of the KamCmdCommand command. Speed is set to the maximum possible for the decoder if iSpeed exceeds the decoders range.

0KamEngGetSpeedSteps

| Parameter List | Type | Range | Direction | Description |
|---|---|---|---|---|
| lDecoderObjectID | long | 1 | In | Decoder object ID |
| lpSpeedSteps | int * | 14,28,128 | Out | Pointer to number of speed steps |

1 Opaque object ID handle returned by KamDecoderPutAdd.

| Return Value | Type | Range | Description |
|---|---|---|---|
| iError | short | 1 | Error flag |

1 iError = 0 for success. Nonzero is an error number (see KamMiscGetErrorMsg).

KamEngGetSpeedSteps takes the decoder object ID and a pointer to a location to store the number of speed steps as a parameter. It sets the memory pointed to by lpSpeedSteps to the number of speed steps.

0KamEngPutSpeedSteps

| Parameter List | Type | Range | Direction | Description |
|---|---|---|---|---|
| lDecoderObjectID | long | 1 | In | Decoder object ID |
| iSpeedSteps | int | 14,28,128 | In | Locomotive speed steps |

1 Opaque object ID handle returned by KamDecoderPutAdd.

| Return Value | Type | Range | Description |
|---|---|---|---|
| iError | short | 1 | Error flag |

1 iError = 0 for success. Nonzero is an error number

-continued (see KamMiscGetErrorMsg).
KamEngPutSpeedSteps takes the decoder object ID and a new number of speed steps as a parameter. It sets the number of speed steps in the locomotive database to iSpeedSteps. Note: This command only changes the locomotive database. The data is not sent to the decoder until execution of the KamCmdCommand command. KamDecoderGetMaxSpeed returns the maximum possible speed for the decoder. An error is generated if an attempt is made to set the speed steps beyond this value.

0KamEngGetFunction

| Parameter List | Type | Range | Direction | Description |
|---|---|---|---|---|
| lDecoderObjectID | long | 1 | In | Decoder object ID |
| iFunctionID | int | 0–8 2 | In | Function ID number |
| lpFunction | int * | 3 | Out | Pointer to function value |

1 Opaque object ID handle returned by KamDecoderPutAdd.
2 FL is 0. F1–F8 are 1–8 respectively. Maximum for this decoder is given by KamEngGetFunctionMax. 3 Function active is boolean TRUE and inactive is boolean FALSE.

| Return Value | Type | Range | Description |
|---|---|---|---|
| iError | short | 1 | Error flag |

1 iError = 0 for success. Nonzero is an error number (see KamMiscGetErrorMsg).
KamEngGetFunction takes the decoder object ID, a function ID, and a pointer to the location to store the specified function state as parameters. It sets the memory pointed to by lpFunction to the specified function state.

0KamEngPutFunction

| Parameter List | Type | Range | Direction | Description |
|---|---|---|---|---|
| lDecoderObjectID | long | 1 | In | Decoder object ID |
| iFunctionID | int | 0–8 2 | In | Function ID number |
| iFunction | int | 3 | In | Function value |

1 Opaque object ID handle returned by KamDecoderPutAdd.
2 FL is 0. F1–F8 are 1–8 respectively. Maximum for this decoder is given by KamEngGetFunctionMax.
3 Function active is boolean TRUE and inactive is boolean FALSE.

| Return Value | Type | Range | Description• |
|---|---|---|---|
| iError | short | 1 | Error flag |

1 iError = 0 for success. Nonzero is an error number (see KamMiscGetErrorMsg).
KamEngPutFunction takes the decoder object ID, a function ID, and a new function state as parameters. It sets the specified locomotive database function state to iFunction. Note: This command only changes the locomotive database. The data is not sent to the decoder until execution of the KamCmdCommand command.

0KamEngGetFunctionMax

| Parameter List | Type | Range | Direction | Description |
|---|---|---|---|---|
| lDecoderObjectID | long | 1 | In | Decoder object ID |
| piMaxFunction | int * | 0–8 | Out | Pointer to maximum function number |

1 Opaque object ID handle returned by KamDecoderPutAdd.

| Return Value | Type | Range | Description |
|---|---|---|---|
| iError | short | 1 | Error flag |

1 iError = 0 for success. Nonzero is an error number (see KamMiscGetErrorMsg).
KamEngGetFunctionMax takes a decoder object ID and a pointer to the maximum function ID as parameters. It sets the memory pointed to by piMaxFunction to the maximum possible function number for the specified decoder.

0KamEngGetName

| Parameter List | Type | Range | Direction | Description |
|---|---|---|---|---|
| lDecoderObjectID | long | 1 | In | Decoder object ID |
| pbsEngName | BSTR * | 2 | Out | Pointer to locomotive name |

1 Opaque object ID handle returned by KamDecoderPutAdd.
2 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number

-continued (see KamMiscGetErrorMsg).
KamEngGetName takes a decoder object ID and a pointer to the locomotive name as parameters. It sets the memory pointed to by pbsEngName to the name of the locomotive.
0KamEngPutName

| Parameter List | Type | Range | Direction | Description• |
|---|---|---|---|---|
| lDecoderObjectID | long | 1 | In | Decoder object ID |
| bsEngName | BSTR | 2 | Out | Locomotive name |

1 Opaque object ID handle returned by KamDecoderPutAdd.
2 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).
KamEngPutName takes a decoder object ID and a BSTR as parameters. It sets the symbolic locomotive name to bsEngName.
0KamEngGetFunctionName

| Parameter List | Type | Range | Direction | Description |
|---|---|---|---|---|
| lDecoderObjectID | long | 1 | In | Decoder object ID |
| iFunctionID | int | 0–8 2 | In | Function ID number |
| pbsFcnNameString | BSTR * | 3 | Out | Pointer to function name |

1 Opaque object ID handle returned by KamDecoderPutAdd.
2 FL is 0. F1–F8 are 1–8 respectively. Maximum for this decoder is given by KamEngGetFunctionMax. 3 Exact return type depends on language. It is Cstring * for C++. Empty string on error.

| Return Value | Type | Range | Description |
|---|---|---|---|
| iError | short | 1 | Error flag |

1 iError• = 0 for success. Nonzero is an error number (see KamMiscGetErrorMsg).
KamEngGetFunctionName takes a decoder object ID, function ID, and a pointer to the function name as parameters. It sets the memory pointed to by pbsFcnNameString to the symbolic name of the specified function.
0KamEngPutFunctionName

| Parameter List | Type | Range | Direction | Description |
|---|---|---|---|---|
| lDecoderObjectID | long | 1 | In | Decoder object ID |
| iFunctionID | int | 0–8 2 | In | Function ID number |
| bsFcnNameString | BSTR | 3 | In | Function name |

1 Opaque object ID handle returned by KamDecoderPutAdd.
2 FL is 0. F1–F8 are 1–8 respectively. Maximum for this decoder is given by KamEngGetFunctionMax.
3 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).
KamEngPutFunctionName takes a decoder object ID, function ID, and a BSTR as parameters. It sets the specified symbolic function name to bsFcnNameString.
0KamEngGetConsistMax

| Parameter List | Type | Range | Direction | Description |
|---|---|---|---|---|
| lDecoderObjectID | long | 1 | In | Decoder object ID |
| piMaxConsist | int * | 2 | Out | Pointer to max consist number |

1 Opaque object ID handle returned by KamDecoderPutAdd.
2 Command station dependent.

| Return Value | Type | Range | Description |
|---|---|---|---|
| iError | short | 1 | Error flag |

1 iError = 0 for success. Nonzero is an error number (see KamMiscGetErrorMsg).
KamEngGetConsistMax takes the decoder object ID and a pointer to a location to store the maximum consist as parameters. It sets the location pointed to by piMaxConsist to the maximum number of locomotives that can but placed in a command station controlled consist. Note that this command is designed for command station consisting. CV consisting is handled using the CV commands.

-continued

0KamEngPutConsistParent

| Parameter List | Type | Range | Direction | Description |
|---|---|---|---|---|
| lDCCParentObjID | long | 1 | In | Parent decoder object ID |
| iDCCAliasAddr | int | 2 | In | Alias decoder address |

1 Opaque object ID handle returned by KamDecoderPutAdd.
2 1–127 for short locomotive addresses. 1–10239 for long locomotive decoders.

| Return Value | Type | Range | Description |
|---|---|---|---|
| iError | short | 1 | Error flag |

1 iError = 0 for success. Nonzero is an error number (see KamMiscGetErrorMsg).
KamEngPutConsistParent takes the parent object ID and an alias address as parameters. It makes the decoder specified by lDCCParentObjID the consist parent referred to by iDCCAliasAddr. Note that this command is designed for command station consisting. CV consisting is handled using the CV commands. If a new parent is defined for a consist; the old parent becomes a child in the consist. To delete a parent in a consist without deleting the consist, you must add a new parent then delete the old parent using KamEngPutConsistRemoveObj.

0KamEngPutConsistChild

| Parameter List | Type | Range | Direction | Description |
|---|---|---|---|---|
| lDCCParentObjID | long | 1 | In | Parent decoder object ID |
| lDCCObjID | long | 1 | In | Decoder object ID |

1 Opaque object ID handle returned by KamDecoderPutAdd.

| Return Value | Type | Range | Description |
|---|---|---|---|
| iError | short | 1 | Error flag |

1 iError = 0 for success. Nonzero is an error number (see KamMiscGetErrorMsg).
KamEngPutConsistChild takes the decoder parent object ID and decoder object ID as parameters. It assigns the decoder specified by lDCCObjID to the consist identified by lDCCParentObjID. Note that this command is designed for command station consisting. CV consisting is handled using the CV commands. Note: This command is invalid if the parent has not been set previously using KamEngPutConsistParent.

0KamEngPutConsistRemoveObj

| Parameter List | Type | Range | Direction | Description |
|---|---|---|---|---|
| lDecoderObjectID | long | 1 | In | Decoder object ID |

1 Opaque object ID handle returned by KamDecoderPutAdd.

| Return Value | Type | Range | Description |
|---|---|---|---|
| iError | short | 1 | Error flag |

1 iError = 0 for success. Nonzero is an error number (see KamMiscGetErrorMsg).
KamEngPutConsistRemoveObj takes the decoder object ID as a parameter. It removes the decoder specified by lDecoderObjectID from the consist. Note that this command is designed for command station consisting. CV consisting is handled using the CV commands. Note: If the parent is removed, all children are removed also.

A. Commands to control accessory decoders

This section describes the commands that control accessory decoders. These commands control things such as accessory decoder activation state. For efficiency, a copy of all the engine variables such speed is stored in the server. Commands such as KamAccGetFunction communicate only with the server, not the actual decoder. You should first make any changes to the server copy of the engine variables. You can send all changes to the engine using the KamCmdCommand command.

0KamAccGetFunction

| Parameter List | Type | Range | Direction | Description |
|---|---|---|---|---|
| lDecoderObjectID | long | 1 | In | Decoder object ID |
| iFunctionID | int | 0–31 2 | In | Function ID number |
| lpFunction | int * | 3 | Out | Pointer to function value |

1 Opaque object ID handle returned by KamDecoderPutAdd.
2 Maximum for this decoder is given by KamAccGetFunctionMax.
3 Function active is boolean TRUE and inactive is -continued boolean FALSE.

| Return Value | Type | Range | Description |
|---|---|---|---|
| iError short | 1 | Error flag | |

1 iError = 0 for success. Nonzero is an error number (see KamMiscGetErrorMsg).

KamAccGetFunction takes the decoder object ID, a function ID, and a pointer to the location to store the specified function state as parameters. It sets the memory pointed to by lpFunction to the specified function state.

0KamAccGetFunctionAll

| Parameter List | Type | Range | Direction | Description |
|---|---|---|---|---|
| lDecoderObjectID | long | 1 | In | Decoder object ID |
| piValue | int * | 2 | Out | Function bit mask |

1 Opaque object ID handle returned by KamDecoderPutAdd.

2 Each bit represents a single function state. Maximum for this decoder is given by KamAccGetFunctionMax.

| Return Value | Type | Range | Description |
|---|---|---|---|
| iError short | 1 | Error flag | |

1 iError = 0 for success. Nonzero is an error number (see KamMiscGetErrorMsg).

KamAccGetFunctionAll takes the decoder object ID and a pointer to a bit mask as parameters. It sets each bit in the memory pointed to by piValue to the corresponding function state.

0KamAccPutFunction

| Parameter List | Type | Range | Direction | Description |
|---|---|---|---|---|
| lDecoderObjectID | long | 1 | In | Decoder object ID |
| iFunctionID | int | 0–31 2 | In | Function ID number |
| iFunction | int | 3 | In | Function value |

1 Opaque object ID handle returned by KamDecoderPutAdd.

2 Maximum for this decoder is given by KamAccGetFunctionMax.

3 Function active is boolean TRUE and inactive is boolean FALSE.

| Return Value | Type | Range | Description• |
|---|---|---|---|
| iError short | 1 | Error flag | |

1 iError = 0 for success. Nonzero is an error number (see KamMiscGetErrorMsg).

KamAccPutFunction takes the decoder object ID, a function ID, and a new function state as parameters. It sets the specified accessory database function state to iFunction. Note: This command only changes the accessory database. The data is not sent to the decoder until execution of the KamCmdCommand command.

0KamAccPutFunctionAll

| Parameter List | Type | Range | Direction | Description |
|---|---|---|---|---|
| lDecoderObjectID | long | 1 | In | Decoder object ID |
| iValue int | 2 | In | Pointer to function state array | |

1 Opaque object ID handle returned by KamDecoderPutAdd.

2 Each bit represents a single function state. Maximum for this decoder is given by KamAccGetFunctionMax.

| Return Value | Type | Range | Description• |
|---|---|---|---|
| iError short | 1 | Error flag | |

1 iError = 0 for success. Nonzero is an error number (see KamMiscGetErrorMsg).

KamAccPutFunctionAll takes the decoder object ID and a bit mask as parameters. It sets all decoder function enable states to match the state bits in iValue. The possible enable states are TRUE and FALSE. The data is not sent to the decoder until execution of the KamCmdCommand command.

0KamAccGetFunctionMax

| Parameter List | Type | Range | Direction | Description |
|---|---|---|---|---|
| lDecoderObjectID | long | 1 | In | Decoder object ID |
| piMaxFunction | int * | 0–31 2 | Out | Pointer to maximum function number |

1 Opaque object ID handle returned by KamDecoderPutAdd.

2 Maximum for this decoder is given by KamAccGetFunctionMax.

| Return Value | Type | Range | Description |
|---|---|---|---|
| iError short | 1 | Error flag | |

1 iError = 0 for success. Nonzero is an error number

-continued (see KamMiscGetErrorMsg).
KamAccGetFunctionMax takes a decoder object ID and pointer to the maximum function number as parameters. It sets the memory pointed to by piMaxFunction to the maximum possible function number for the specified decoder.
0KamAccGetName

| Parameter List | Type | Range | Direction | Description |
|---|---|---|---|---|
| lDecoderObjectID | long | 1 | In | Decoder object ID |
| pbsAccNameString | BSTR * 2 | | Out | Accessory name |

1 Opaque object ID handle returned by KamDecoderPutAdd.
2 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number (see KamMiscGetErrorMsg).
KamAccGetName takes a decoder object ID and a pointer to a string as parameters. It sets the memory pointed to by pbsAccNameString to the name of the accessory.
0KamAccPutName

| Parameter List | Type | Range | Direction | Description |
|---|---|---|---|---|
| lDecoderObjectID | long | 1 | In | Decoder object ID |
| bsAccNameString | BSTR | 2 | In | Accessory name |

1 Opaque object ID handle returned by KamDecoderPutAdd.
2 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).
KamAccPutName takes a decoder object ID and a BSTR as parameters. It sets the symbolic accessory name to bsAccName.
0KamAccGetFunctionName

| Parameter List | Type | Range | Direction | Description |
|---|---|---|---|---|
| lDecoderObjectID | long | 1 | In | Decoder object ID |
| iFunctionID | int | 0–31 2 | In | Function ID number |
| pbsFcnNameString | BSTR * 3 | | Out | Pointer to function name |

1 Opaque object ID handle returned by KamDecoderPutAdd.
2 Maximum for this decoder is given by KamAccGetFunctionMax.
3 Exact return type depends on language. It is Cstring * for C++. Empty string on error.

| Return Value | Type | Range | Description• |
|---|---|---|---|
| iError | short | 1 | Error flag |

1 iError = 0 for success. Nonzero is an error number (see KamMiscGetErrorMsg).
KamAccGetFunctionName takes a decoder object ID, function ID, and a pointer to a string as parameters. It sets the memory pointed to by pbsFcnNameString to the symbolic name of the specified function.
0KamAccPutFunctionName

| Parameter List | Type | Range | Direction | Description |
|---|---|---|---|---|
| lDecoderObjectID | long | 1 | In | Decoder object ID |
| iFunctionID | int | 0–31 2 | In | Function ID number |
| bsFcnNameString | BSTR | 3 | In | Function name |

1 Opaque object ID handle returned by KamDecoderPutAdd.
2 Maximum for this decoder is given by KamAccGetFunctionMax.
3 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).
KamAccPutFunctionName takes a decoder object ID, function ID, and a BSTR as parameters. It sets the specified symbolic function name to bsFcnNameString.
0KamAccRegFeedback

| Parameter List | Type | Range | Direction | Description• |
|---|---|---|---|---|
| lDecoderObjectID | long | 1 | In | Decoder object ID |
| bsAccNode | BSTR | 1 | In | Server node name |
| iFunctionID | int | 0–31 3 | In | Function ID number |

-continued

1 Opaque object ID handle returned by KamDecoderPutAdd.
2 Exact parameter type depends on language. It is LPCSTR for C++.
3 Maximum for this decoder is given by KamAccGetFunctionMax.

| Return Value | Type | Range | Description |
|---|---|---|---|
| iError | short | 1 | Error flag |

1 iError• = 0 for success. Nonzero is an error number (see KamMiscGetErrorMsg).

KamAccRegFeedback takes a decoder object ID, node name string, and function ID, as parameters. It registers interest in the function given by iFunctionID by the method given by the node name string bsAccNode. bsAccNode identifies the server application and method to call if the function changes state. Its format is "\\{Server}\{App}.{Method}" where {Server} is the server name, {App} is the application name, and {Method} is the method name.

0KamAccRegFeedbackAll

| Parameter List | Type | Range | Direction | Description |
|---|---|---|---|---|
| lDecoderObjectID | long | 1 | In | Decoder object ID |
| bsAccNode | BSTR | 2 | In | Server node name |

1 Opaque object ID handle returned by KamDecoderPutAdd.
2 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).

KamAccRegFeedbackAll takes a decoder object ID and node name string as parameters. It registers interest in all functions by the method given by the node name string bsAccNode. bsAccNode identifies the server application and method to call if the function changes state. Its format is "\\{Server}\{App}.{Method}" where {Server} is the server name, {App} is the application name, and {Method} is the method name.

0KamAccDelFeedback

| Parameter List | Type | Range | Direction | Description |
|---|---|---|---|---|
| lDecoderObjectID | long | 1 | In | Decoder object ID |
| bsAccNode | BSTR | 2 | In | Server node name |
| iFunctionID | int | 0–31 3 | In | Function ID number |

1 Opaque object ID handle returned by KamDecoderPutAdd.
2 Exact parameter type depends on language. It is LPCSTR for C++.
3 Maximum for this decoder is given by KamAccGetFunctionMax.

| Return Value | Type | Range | Description |
|---|---|---|---|
| iError | short | 1 | Error flag |

1 iError = 0 for success. Nonzero is an error number (see KamMiscGetErrorMsg).

KamAccDelFeedback takes a decoder object ID, node name string, and function ID, as parameters. It deletes interest in the function given by iFunctionID by the method given by the node name string bsAccNode. bsAccNode identifies the server application and method to call if the function changes state. Its format is "\\{Server}\{App}.{Method}" where {Server} is the server name, {App} is the application name, and {Method} is the method name.

0KamAccDelFeedbackAll

| Parameter List | Type | Range | Direction | Description• |
|---|---|---|---|---|
| lDecoderObjectID | long | 1 | In | Decoder object ID |
| bsAccNode | BSTR | 2 | In | Server node name |

1 Opaque object ID handle returned by KamDecoderPutAdd.
2 Exact parameter type depends on language. It is LPCSTR for C++.

| Return Value | Type | Range | Description |
|---|---|---|---|
| iError | short | 1 | Error flag |

1 iError = 0 for success. Nonzero is an error number (see KamMiscGetErrorMsg).

KamAccDelFeedbackAll takes a decoder object ID and node name string as parameters. It deletes interest in all functions by the method given by the node name string bsAccNode. bsAccNode identifies the server application -continued and method to call if the function changes state. Its format is "\\{Server}\{App}.{Method}" where {Server} is the server name, {App} is the application name, and {Method} is the method name.

A. Commands to control the command station

This section describes the commands that control the command station. These commands do things such as controlling command station power. The steps to control a given command station vary depending on the type of command station.

0KamOprPutTurnOnStation

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).

KamOprPutTurnOnStation takes a logical port ID as a parameter. It performs the steps necessary to turn on the command station. This command performs a combination of other commands such as KamOprPutStartStation, KamOprPutClearStation, and KamOprPutPowerOn.

0KamOprPutStartStation

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).

KamOprPutStartStation takes a logical port ID as a parameter. It performs the steps necessary to start the command station.

0KamOprPutClearStation

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).

KamOprPutClearStation takes a logical port ID as a parameter. It performs the steps necessary to clear the command station queue.

0KamOprPutStopStation

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).

KamOprPutStopStation takes a logical port ID as a parameter. It performs the steps necessary to stop the command station.

0KamOprPutPowerOn

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).

KamOprPutPowerOn takes a logical port ID as a parameter. It performs the steps necessary to apply power to the track.

0KamOprPutPowerOff

| Parameter List | Type | Range | Direction | Description |
| --- | --- | --- | --- | --- |
| iLogicalPortID | int | 1–65535 1 | In | Logical port ID |

1 Maximum value for this server given by KamPortGetMaxLogPorts.

| Return Value | Type | Range | Description |
| --- | --- | --- | --- |
| iError | short | 1 | Error flag |

-continued 1 iError = 0 for success. Nonzero is an error number (see KamMiscGetErrorMsg).

KamOprPutPowerOff takes a logical port ID as a parameter. It performs the steps necessary to remove power from the track.

0KamOprPutHardReset

| Parameter List | Type | Range | Direction | Description |
|---|---|---|---|---|
| iLogicalPortID | int | 1–65535 1 | In | Logical port ID |

1 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).

KamOprPutHardReset takes a logical port ID as a parameter. It performs the steps necessary to perform a hard reset of the command station.

0KamOprPutEmergencyStop

| Parameter List | Type | Range | Direction | Description |
|---|---|---|---|---|
| iLogicalPortID | int | 1–65535 1 | In | Logical port ID |

1 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).

KamOprPutEmergencyStop takes a logical port ID as a parameter. It performs the steps necessary to broadcast an emergency stop command to all decoders.

0KamOprGetStationStatus

| Parameter List | Type | Range | Direction | Description |
|---|---|---|---|---|
| iLogicalPortID | int | 1–65535 1 | In | Logical port ID |
| pbsCmdStat | BSTR * 2 | | Out | Command station status string |

1 Maximum value for this server given by KamPortGetMaxLogPorts.

2 Exact return type depends on language. It is Cstring * for C++.

| Return Value | Type | Range | Description |
|---|---|---|---|
| iError | short | 1 | Error flag |

1 iError = 0 for success. Nonzero is an error number (see KamMiscGetErrorMsg).

KamOprGetStationStatus takes a logical port ID and a pointer to a string as parameters. It set the memory pointed to by pbsCmdStat to the command station status. The exact format of the status BSTR is vendor dependent.

A. Commands to configure the command station communication port

This section describes the commands that configure the command station communication port. These commands do things such as setting BAUD rate. Several of the commands in this section use the numeric controller ID (iControllerID) to identify a specific type of command station controller. The following table shows the mapping between the controller ID (iControllerID) and controller name (bsControllerName) for a given type of command station controller.

| iControllerID | bsControllerName | Description |
|---|---|---|
| 0 | UNKNOWN | Unknown controller type |
| 1 | SIMULAT | Interface simulator |
| 2 | LENZ_1x | Lenz version 1 serial support module |
| 3 | LENZ_2x | Lenz version 2 serial support module |
| 4 | DIGIT_DT200 | Digitrax direct drive support using DT200 |
| 5 | DIGIT_DCS100 | Digitrax direct drive support using DCS100 |
| 6 | MASTERSERIES | North coast engineering master series |
| 7 | SYSTEMONE | System one |
| 8 | RAMFIX | RAMFIxx system |
| 9 | SERIAL | NMRA serial interface |
| 10 | EASYDCC | CVP Easy DCC |
| 11 | MRK6050 | Marklin 6050 interface (AC and DC) |
| 12 | MRK6023 | Marklin 6023 interface (AC) |
| 13 | DIGIT_PR1 | Digitrax direct drive using PR1 |
| 14 | DIRECT | Direct drive interface routine |
| 15 | ZTC | ZTC system ltd |
| 16 | TRIX | TRIX controller |

-continued

| iIndex | Name | iValue Values |
|---|---|---|
| 0 | RETRANS | 10–255 |
| 1 | RATE | 0 - 300 BAUD, 1 - 1200 BAUD, 2 - 2400 BAUD, 3 - 4800 BAUD, 4 - 9600 BAUD, 5 - 14400 BAUD, 6 - 16400 BAUD, 7 - 19200 BAUD |
| 2 | PARITY | 0 - NONE, 1 - ODD, 2 - EVEN, 3 - MARK, 4 - SPACE |
| 3 | STOP | 0 - 1 bit, 1 - 1.5 bits, 2 - 2 bits |
| 4 | WATCHDOG | 500 - 65535 milliseconds. Recommended value 2048 |
| 5 | FLOW | 0 - NONE, 1 - XON/XOFF, 2 - RTS/CTS, 3 BOTH |
| 6 | DATA | 0 - 7 bits, 1 - 8 bits |
| 7 | DEBUG | Bit mask. Bit 1 sends messages to debug file. Bit 2 sends messages to the screen. Bit 3 shows queue data. Bit 4 shows UI status. Bit 5 is reserved. Bit 6 shows semaphore and critical sections. Bit 7 shows miscellaneous messages. Bit 8 shows comm port activity. 130 decimal is recommended for debugging. |
| 8 | PARALLEL | |

0KamPortPutConfig

| Parameter List | Type | Range | Direction | Description• |
|---|---|---|---|---|
| iLogicalPortID | int | 1–65535 1 | In | Logical port ID |
| iIndex | int | 2 | In | Configuration type index |
| iValue | int | 2 | In | Configuration value |
| iKey | int | 3 | In | Debug key |

1 Maximum value for this server given by KamPortGetMaxLogPorts.
2 See Figure 7: Controller configuration Index values for a table of indexes and values.
3 Used only for the DEBUG iIndex value. Should be set to 0.

| Return Value | Type | Range | Description |
|---|---|---|---|
| iError | short | 1 | Error flag |

1 iError = 0 for success. Nonzero is an error number (see KamMiscGetErrorMsg).

KamPortPutConfig takes a logical port ID, configuration index, configuration value, and key as parameters. It sets the port parameter specified by iIndex to the value specified by iValue. For the DEBUG iIndex value, the debug file path is C:\Temp\Debug{PORT}.txt where {PORT} is the physical comm port ID.

0KamPortGetConfig

| Parameter List | Type | Range | Direction | Description |
|---|---|---|---|---|
| iLogicalPortID | int | 1–65535 1 | In | Logical port ID |
| iIndex | int | 2 | In | Configuration type index |
| piValue | int * | 2 | Out | Pointer to configuration value |

1 Maximum value for this server given by KamPortGetMaxLogPorts.
2 See Figure 7: Controller configuration Index values for a table of indexes and values.

| Return Value | Type | Range | Description |
|---|---|---|---|
| iError | short | 1 | Error flag |

1 iError = 0 for success. Nonzero is an error number (see KamMiscGetErrorMsg).

KamPortGetConfig takes a logical port ID, configuration index, and a pointer to a configuration value as parameters. It sets the memory pointed to by piValue to the specified configuration value.

0KamPortGetName

| Parameter List | Type | Range | Direction | Description |
|---|---|---|---|---|
| iPhysicalPortID | int | 1–65535 1 | In | Physical port number |
| pbsPortName | BSTR * | 2 | Out | Physical port name |

1 Maximum value for this server given by KamPortGetMaxPhysical.
2 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number (see KamMiscGetErrorMsg).

KamPortGetName takes a physical port ID number and a pointer to a port name string as parameters. It sets the memory pointed to by pbsPortName to the physical port name such as "COMM1."

0KamPortPutMapController

| Parameter List | Type | Range | Direction | Description |
|---|---|---|---|---|
| iLogicalPortID | int | 1–65535 1 | In | Logical port ID |

-continued

| | | | | | |
|---|---|---|---|---|---|
| iControllerID | int | 1–65535 | 2 | In | Command station type ID |
| iCommPortID | int | 1–65535 | 3 | In | Physical comm port ID |

Figure 6:
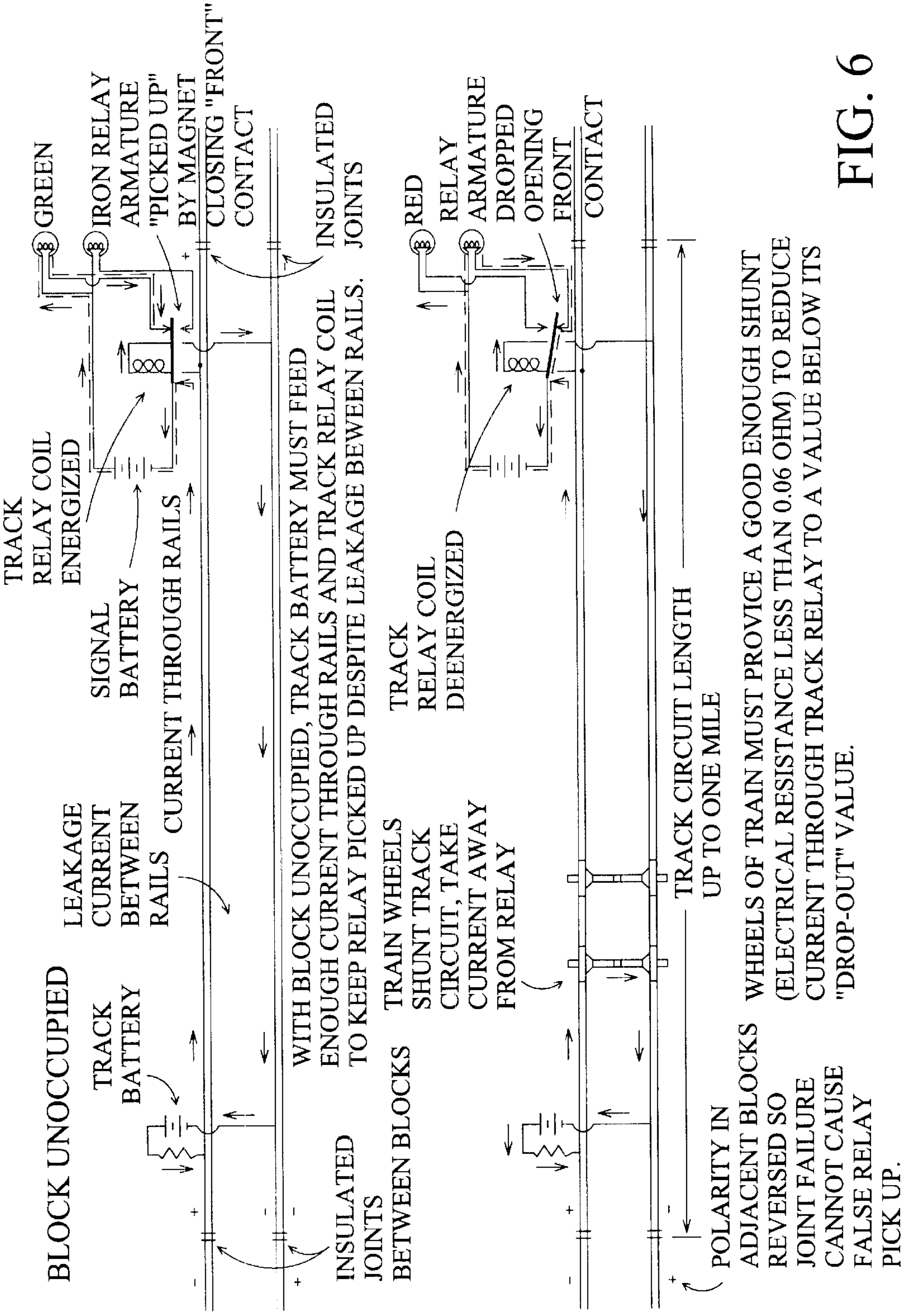
FIG. 6 is an illustration of a track circuit.

1 Maximum value for this server given by KamPortGetMaxLogPorts.
2 See Figure 6: Controller ID to controller name mapping for values. Maximum value for this server is given by KamMiscMaxControllerID.
3 Maximum value for this server given by KamPortGetMaxPhysical.

| Return Value | Type | Range | Description |
|---|---|---|---|
| iError | short | 1 | Error flag |

1 iError = 0 for success. Nonzero is an error number (see KamMiscGetErrorMsg).

KamPortPutMapController takes a logical port ID, a command station type ID, and a physical communications port ID as parameters. It maps iLogicalPortID to iCommPortID for the type of command station specified by iControllerID.

0KamPortGetMaxLogPorts

| Parameter List | Type | Range | Direction | Description• |
|---|---|---|---|---|
| piMaxLogicalPorts | int * | 1 | Out | Maximum logical port ID |

1 Normally 1 - 65535. 0 returned on error.

| Return Value | Type | Range | Description |
|---|---|---|---|
| iError | short | 1 | Error flag |

1 iError = 0 for success. Nonzero is an error number (see KamMiscGetErrorMsg).

KamPortGetMaxLogPorts takes a pointer to a logical port ID as a parameter. It sets the memory pointed to by piMaxLogicalPorts to the maximum logical port ID.

0KamPortGetMaxPhysical

| Parameter List | Type | Range | Direction | Description |
|---|---|---|---|---|
| pMaxPhysical | int * | 1 | Out | Maximum physical port ID |
| pMaxSerial | int * | 1 | Out | Maximum serial port ID |
| pMaxParallel | int * | 1 | Out | Maximum parallel port ID |

1 Normally 1 - 65535. 0 returned on error.

| Return Value | Type | Range | Description |
|---|---|---|---|
| iError | short | 1 | Error flag |

1 iError = 0 for success. Nonzero is an error number (see KamMiscGetErrorMsg).

KamPortGetMaxPhysical takes a pointer to the number of physical ports, the number of serial ports, and the number of parallel ports as parameters. It sets the memory pointed to by the parameters to the associated values A. Commands that control command flow to the command station This section describes the commands that control the command flow to the command station. These commands do things such as connecting and disconnecting from the command station.

0KamCmdConnect

| Parameter List | Type | Range | Direction | Description• |
|---|---|---|---|---|
| iLogicalPortID | int | 1–65535 | 1 In | Logical port ID |

1 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).

KamCmdConnect takes a logical port ID as a parameter. It connects the server to the specified command station.

0KamCmdDisConnect

| Parameter List | Type | Range | Direction | Description |
|---|---|---|---|---|
| iLogicalPortID | int | 1–65535 | 1 In | Logical port ID |

1 Maximum value for this server given by KamPortGetMaxLogPorts.

| Return Value | Type | Range | Description |
|---|---|---|---|
| iError | short | 1 | Error flag |

1 iError = 0 for success. Nonzero is an error number (see KamMiscGetErrorMsg).

KamCmdDisConnect takes a logical port ID as a parameter. It disconnects the server to the specified command station.

-continued

0KamCmdCommand
Parameter List Type Range Direction Description
lDecoderObjectID long 1 In Decoder object ID
1 Opaque object ID handle returned by KamDecoderPutAdd.
Return Value Type Range Description
iError short 1 Error flag
1 iError = 0 for success. Nonzero is an error number (see KamMiscGetErrorMsg).
KamCmdCommand takes the decoder object ID as a parameter. It sends all state changes from the server database to the specified locomotive or accessory decoder.
A. Cab Control Commands
This section describes commands that control the cabs attached to a command station.
0KamCabGetMessage
Parameter List Type Range Direction Description
iCabAddress int 1–65535 1 In Cab address
pbsMsg BSTR * 2 Out Cab message string
1 Maximum value is command station dependent.
2 Exact return type depends on language. It is Cstring * for C++. Empty string on error.
Return Value Type Range Description
iError short 1 Error flag
1 iError = 0 for success. Nonzero is an error number (see KamMiscGetErrorMsg).
KamCabGetMessage takes a cab address and a pointer to a message string as parameters. It sets the memory pointed to by pbsMsg to the present cab message.
0KamCabPutMessage
Parameter List Type Range Direction Description
iCabAddress int 1 In Cab address
bsMsg BSTR 2 Out Cab message string
1 Maximum value is command station dependent.
2 Exact parameter type depends on language. It is LPCSTR for C++.
Return Value Type Range Description
iError short 1 Error flag
1 iError = 0 for success. Nonzero is an error number (see KamMiscGetErrorMsg).
KamCabPutMessage takes a cab address and a BSTR as parameters. It sets the cab message to bsMsg.
0KamCabGetCabAddr
Parameter List Type Range Direction Description•
lDecoderObjectID long 1 In Decoder object ID
piCabAddress int * 1–65535 2 Out Pointer to Cab address
1 Opaque object ID handle returned by KamDecoderPutAdd.
2 Maximum value is command station dependent.
Return Value Type Range Descriptioni
Error short 1 Error flag
1 iError = 0 for success. Nonzero is an error number (see KamMiscGetErrorMsg).
KamCabGetCabAddr takes a decoder object ID and a pointer to a cab address as parameters. It set the memory pointed to by piCabAddress to the address of the cab attached to the specified decoder.
0KamCabPutAddrToCab
Parameter List Type Range Direction Description
lDecoderObjectID long 1 In Decoder object ID
iCabAddress int 1–65535 2 In Cab address
1 Opaque object ID handle returned by KamDecoderPutAdd.
2 Maximum value is command station dependent.
Return Value Type Range Description
iError short 1 Error flag
1 iError = 0 for success. Nonzero is an error number (see KamMiscGetErrorMsg).
KamCabPutAddrToCab takes a decoder object ID and cab address as parameters. It attaches the decoder specified by iDCCAddr to the cab specified by iCabAddress.
A. Miscellaneous Commands
This section describes miscellaneous commands that do not fit into the other categories.
0KamMiscGetErrorMsg
Parameter List Type Range Direction Description
iError int 0–65535 1 In Error flag
1 iError = 0 for success. Nonzero indicates an error.

-continued

| Return Value | Type | Range | Description |
|---|---|---|---|
| bsErrorString | BSTR | 1 | Error string |

1 Exact return type depends on language. It is Cstring for C++. Empty string on error.

KamMiscGetErrorMsg takes an error flag as a parameter. It returns a BSTR containing the descriptive error message associated with the specified error flag.

0KamMiscGetClockTime

| Parameter List | Type | Range | Direction | Description |
|---|---|---|---|---|
| iLogicalPortID | int | 1–65535 1 | In | Logical port ID |
| iSelectTimeMode | int | 2 | In | Clock source |
| piDay | int * | 0–6 | Out | Day of week |
| piHours | int * | 0–23 | Out | Hours |
| piMinutes | int * | 0–59 | Out | Minutes |
| piRatio | int * | 3 | Out | Fast clock ratio |

1 Maximum value for this server given by KamPortGetMaxLogPorts.

2 0 - Load from command station and sync server. 1 - Load direct from server. 2 - Load from cached server copy of command station time.

3 Real time clock ratio.

| Return Value | Type | Range | Description |
|---|---|---|---|
| iError | short | 1 | Error flag |

1 iError = 0 for success. Nonzero is an error number (see KamMiscGetErrorMsg).

KamMiscGetClockTime takes the port ID, the time mode, and pointers to locations to store the day, hours, minutes, and fast clock ratio as parameters. It sets the memory pointed to by piDay to the fast clock day, sets pointed to by piHours to the fast clock hours, sets the memory pointed to by piMinutes to the fast clock minutes, and the memory pointed to by piRatio to the fast clock ratio. The servers local time will be returned if the command station does not support a fast clock.

0KamMiscPutClockTime

| Parameter List | Type | Range | Direction | Description |
|---|---|---|---|---|
| iLogicalPortID | int | 1–65535 1 | In | Logical port ID |
| iDay | int | 0–6 | In | Day of week |
| iHours | int | 0–23 | In | Hours |
| iMinutes | int | 0–59 | In | Minutes |
| iRatio | int | 2 | In | Fast clock ratio |

1 Maximum value for this server given by KamPortGetMaxLogPorts. 2 Real time clock ratio.

| Return Value | Type | Range | Description |
|---|---|---|---|
| iError | short | 1 | Error flag |

1 iError = 0 for success. Nonzero is an error number (see KamMiscGetErrorMsg).

KamMiscPutClockTime takes the fast clock logical port, the fast clock day, the fast clock hours, the fast clock minutes, and the fast clock ratio as parameters. It sets the fast clock using specified parameters.

0KamMiscGetInterfaceVersion

| Parameter List | Type | Range | Direction | Description |
|---|---|---|---|---|
| pbsInterfaceVersion | BSTR * | 1 | Out | Pointer to interface version string |

1 Exact return type depends on language. It is Cstring * for C++. Empty string on error.

| Return Value | Type | Range | Description |
|---|---|---|---|
| iError | short | 1 | Error flag |

1 iError = 0 for success. Nonzero is an error number (see KamMiscGetErrorMsg).

KamMiscGetInterfaceVersion takes a pointer to an interface version string as a parameter. It sets the memory pointed to by pbsInterfaceVersion to the interface version string. The version string may contain multiple lines depending on the number of interfaces supported.

0KamMiscSaveData

| Parameter List | Type | Range | Direction | Description |
|---|---|---|---|---|
| NONE | | | | |

| Return Value | Type | Range | Description |
|---|---|---|---|
| iError | short | 1 | Error flag |

1 iError = 0 for success. Nonzero is an error number (see KamMiscGetErrorMsg).

KamMiscSaveData takes no parameters. It saves all server data to permanent storage. This command is run automatically whenever the server stops running. Demo versions of the program cannot save data and this command will return an error in that case.

0KamMiscGetControllerName

-continued

Parameter List Type Range Direction Description
iControllerID int 1–65535 1 In Command station type ID
pbsName BSTR * 2 Out Command station type name
1 See Figure 6: Controller ID to controller name mapping for values. Maximum value for this server is given by KamMiscMaxControllerID.
2 Exact return type depends on language. It is Cstring * for C++. Empty string on error.
Return Value Type Range Description
bsName BSTR 1 Command station type name
Return Value Type Range Description
iError short 1 Error flag
1 iError = 0 for success. Nonzero is an error number (see KamMiscGetErrorMsg).
KamMiscGetControllerName takes a command station type ID and a pointer to a type name string as parameters. It sets the memory pointed to by pbsName to the command station type name.
0KamMiscGetControllerNameAtPort
Parameter List Type Range Direction Description
iLogicalPortID int 1–65535 1 In Logical port ID
pbsName BSTR * 2 Out Command station type name
1 Maximum value for this server given by KamPortGetMaxLogPorts.
2 Exact return type depends on language. It is Cstring * for C++. Empty string on error.
Return Value Type Range Description
iError short 1 Error flag
1 iError = 0 for success. Nonzero is an error number (see KamMiscGetErrorMsg).
KamMiscGetControllerName takes a logical port ID and a pointer to a command station type name as parameters. It sets the memory pointed to by pbsName to the command station type name for that logical port.
0KamMiscGetCommandStationValue
Parameter List Type Range Direction Description
iControllerID int 1–65535 1 In Command station type ID
iLogicalPortID int 1–65535 2 In Logical port ID
iIndex int 3 In Command station array index
piValue int * 0 - 65535 Out Command station value
1 See Figure 6: Controller ID to controller name mapping for values. Maximum value for this server is given by KamMiscMaxControllerID.
2 Maximum value for this server given by KamPortGetMaxLogPorts.
3 0 to KamMiscGetCommandStationIndex
Return Value Type Range Description
iError short 1 Error flag
1 iError = 0 for success. Nonzero is an error number (see KamMiscGetErrorMsg).
KamMiscGetCommandStationValue takes the controller ID, logical port, value array index, and a pointer to the location to store the selected value. It sets the memory pointed to by piValue to the specified command station miscellaneous data value.
0KamMiscSetCommandStationValue
Parameter List Type Range Direction Description
iControllerID int 1–65535 1 In Command station type ID
iLogicalPortID int 1–65535 2 In Logical port ID
iIndex int 3 In Command station array index
iValue int 0 - 65535 In Command station value
1 See Figure 6: Controller ID to controller name mapping for values. Maximum value for this server is given by KamMiscMaxControllerID.
2 Maximum value for this server given by KamPortGetMaxLogPorts. 3 0 to KamMiscGetCommandStationIndex.
Return Value Type Range Description
iError short 1 Error flag
1 iError = 0 for success. Nonzero is an error number (see KamMiscGetErrorMsg).
KamMiscSetCommandStationValue takes the controller ID, logical port, value array index, and new miscellaneous data value. It sets the specified command station data -continued to the value given by piValue.
0KamMiscGetCommandStationIndex

| Parameter List | Type | Range | Direction | | Description |
| --- | --- | --- | --- | --- | --- |
| iControllerID | int | 1–65535 | 1 | In | Command station type ID |
| iLogicalPortID | int | 1–65535 | 2 | In | Logical port ID |
| piIndex | int | 0–65535 | | Out | Pointer to maximum index |

1 See Figure 6: Controller ID to controller name mapping for values. Maximum value for this server is given by KamMiscMaxControllerID.
2 Maximum value for this server given by KamPortGetMaxLogPorts.

| Return Value | Type | Range | Description |
| --- | --- | --- | --- |
| iError | short | 1 | Error flag |

1 iError = 0 for success. Nonzero is an error number (see KamMiscGetErrorMsg).
KamMiscGetCommandStationIndex takes the controller ID, logical port, and a pointer to the location to store the maximum index. It sets the memory pointed to by piIndex to the specified command station maximum miscellaneous data index.
0KamMiscMaxControllerID

| Parameter List | Type | Range | Direction | Description |
| --- | --- | --- | --- | --- |
| piMaxControllerID | int * | 1–65535 1 | Out | Maximum controller type ID |

1 See Figure 6: Controller ID to controller name mapping for a list of controller ID values. 0 returned on error.

| Return Value | Type | Range | Description |
| --- | --- | --- | --- |
| iError | short | 1 | Error flag |

1 iError = 0 for success. Nonzero is an error number (see KamMiscGetErrorMsg).
KamMiscMaxControllerID takes a pointer to the maximum controller ID as a parameter. It sets the memory pointed to by piMaxControllerID to the maximum controller type ID.
0KamMiscGetControllerFacility

| Parameter List | Type | Range | Direction | | Description |
| --- | --- | --- | --- | --- | --- |
| iControllerID | int | 1–65535 | 1 | In | Command station type ID |
| pdwFacility | long * | 2 | | Out | Pointer to command station facility mask |

1 See Figure 6: Controller ID to controller name mapping for values. Maximum value for this server is given by KamMiscMaxControllerID.
2
0 - CMDSDTA_PRGMODE_ADDR
1 - CMDSDTA_PRGMODE_REG
2 - CMDSDTA_PRGMODE_PAGE
3 - CMDSDTA_PRGMODE_DIR
4 - CMDSDTA_PRGMODE_FLYSHT
5 - CMDSDTA_PRGMODE_FLYLNG
6 - Reserved
7 - Reserved
8 - Reserved
9 - Reserved
10 - CMDSDTA_SUPPORT_CONSIST
11 - CMDSDTA_SUPPORT_LONG
12 - CMDSDTA_SUPPORT_FEED
13 - CMDSDTA_SUPPORT_2TRK
14 - CMDSDTA_PROGRAM_TRACK
15 - CMDSDTA_PROGMAIN_POFF
16 - CMDSDTA_FEDMODE_ADDR
17 - CMDSDTA_FEDMODE_REG
18 - CMDSDTA_FEDMODE_PAGE
19 - CMDSDTA_FEDMODE_DIR
20 - CMDSDTA_FEDMODE_FLYSHT
21 - CMDSDTA_FEDMODE_FLYLNG
30 - Reserved
31 - CMDSDTA_SUPPORT_FASTCLK

| Return Value | Type | Range | Description |
| --- | --- | --- | --- |
| iError | short | 1 | Error flag |

1 iError = 0 for success. Nonzero is an error number (see KamMiscGetErrorMsg).

KamMiscGetControllerFacility takes the controller ID and a pointer to the location to store the selected controller facility mask. It sets the memory pointed to by pdwFacility to the specified command station facility mask.

The digital command stations 18 program the digital devices, such as a locomotive and switches, of the railroad layout. For example, a locomotive may include several different registers that control the horn, how the light blinks, speed curves for operation, etc. In many such locomotives there are 106 or more programable values. Unfortunately, it may take 1–10 seconds per byte wide word if a valid register or control variable (generally referred to collectively as registers) and two to four minutes to error out if an invalid register to program such a locomotive or device, either of which may contain a decoder. With a large number of byte wide words in a locomotive its takes considerable time to fully program the locomotive. Further, with a railroad layout including many such locomotives and other programmable devices, it takes a substantial amount of time to completely program all the devices of the model railroad layout. During the programming of the railroad layout, the operator is sitting there not enjoying the operation of the railroad layout, is frustrated, loses operating enjoyment, and will not desire to use digital programmable devices. In addition, to reprogram the railroad layout the operator must reprogram all of the devices of the entire railroad layout which takes substantial time. Similarly, to determine the state of all the devices of the railroad layout the operator must read the registers of each device likewise taking substantial time. Moreover, to reprogram merely a few bytes of a particular device requires the operator to previously know the state of the registers of the device which is obtainable by reading the registers of the device taking substantial time, thereby still frustrating the operator.

The present inventor came to the realization that for the operation of a model railroad the anticipated state of the individual devices of the railroad, as programmed, should be maintained during the use of the model railroad and between different uses of the model railroad. By maintaining data representative of the current state of the device registers of the model railroad determinations may be made to efficiently program the devices. When the user designates a command to be executed by one or more of the digital command stations 18, the software may determine which commands need to be sent to one or more of the digital command stations 18 of the model railroad. By only updating those registers of particular devices that are necessary to implement the commands of a particular user, the time necessary to program the railroad layout is substantially reduced. For example, if the command would duplicate the current state of the device then no command needs to be forwarded to the digital command stations 18. This prevents redundantly programming the devices of the model railroad, thereby freeing up the operation of the model railroad for other activities.

Unlike a single-user single-railroad environment, the system of the present invention may encounter "conflicting" commands that attempt to write to and read from the devices of the model railroad. For example, the "conflicting" commands may inadvertently program the same device in an inappropriate manner, such as the locomotive to speed up to maximum and the locomotive to stop. In addition, a user that desires to read the status of the entire model railroad layout will monopolize the digital decoders and command stations for a substantial time, such as up to two hours, thereby preventing the enjoyment of the model railroad for the other users. Also, a user that programs an extensive number of devices will likewise monopolize the digital decoders and command stations for a substantial time thereby preventing the enjoyment of the model railroad for other users.

In order to implement a networked selective updating technique the present inventor determined that it is desirable to implement both a write cache and a read cache. The write cache contains those commands yet to be programmed by the digital command stations 18. Valid commands from each user are passed to a queue in the write cache. In the event of multiple commands from multiple users (depending on user permissions and security) or the same user for the same event or action, the write cache will concatenate the two commands into a single command to be programmed by the digital command stations 18. In the event of multiple commands from multiple users or the same user for different events or actions, the write cache will concatenate the two commands into a single command to be programmed by the digital command stations 18. The write cache may forward either of the commands, such as the last received command, to the digital command station. The users are updated with the actual command programmed by the digital command station, as necessary.

The read cache contains the state of the different devices of the model railroad. After a command has been written to a digital device and properly acknowledged, if necessary, the read cache is updated with the current state of the model railroad. In addition, the read cache is updated with the state of the model railroad when the registers of the devices of the model railroad are read. Prior to sending the commands to be executed by the digital command stations 18 the data in the write cache is compared against the data in the read cache. In the event that the data in the read cache indicates that the data in the write cache does not need to be programmed, the command is discarded. In contrast, if the data in the read cache indicates that the data in the write cache needs to be programmed, then the command is programmed by the digital command station. After programming the command by the digital command station the read cache is updated to reflect the change in the model railroad. As becomes apparent, the use of a write cache and a read cache permits a decrease in the number of registers that need to be programmed, thus speeding up the apparent operation of the model railroad to the operator.

The present inventor further determined that errors in the processing of the commands by the railroad and the initial unknown state of the model railroad should be taken into account for a robust system. In the event that an error is received in response to an attempt to program (or read) a device, then the state of the relevant data of the read cache is marked as unknown. The unknown state merely indicates that the state of the register has some ambiguity associated therewith. The unknown state may be removed by reading the current state of the relevant device or the data rewritten to the model railroad without an error occurring. In addition, if an error is received in response to an attempt to program (or read) a device, then the command may be re-transmitted to the digital command station in an attempt to program the device properly. If desirable, multiple commands may be automatically provided to the digital command stations to increase the likelihood of programming the appropriate registers. In addition, the initial state of a register is likewise marked with an unknown state until data becomes available regarding its state.

When sending the commands to be executed by the digital command stations 18 they are preferably first checked against the read cache, as previously mentioned. In the event that the read cache indicates that the state is unknown, such as upon initialization or an error, then the command should be sent to the digital command station because the state is not known. In this manner the state will at least become known, even if the data in the registers is not actually changed.

The present inventor further determined a particular set of data that is useful for a complete representation of the state of the registers of the devices of the model railroad.

An invalid representation of a register indicates that the particular register is not valid for both a read and a write operation. This permits the system to avoid attempting to read from and write to particular registers of the model railroad. This avoids the exceptionally long error out when attempting to access invalid registers.

An in use representation of a register indicates that the particular register is valid for both a read and a write operation. This permits the system to read from and write to particular registers of the model railroad. This assists in accessing valid registers where the response time is relatively fast.

A read error (unknown state) representation of a register indicates that each time an attempt to read a particular register results in an error.

A read dirty representation of a register indicates that the data in the read cache has not been validated by reading its valid from the decoder. If both the read error and the read dirty representations are clear then a valid read from the read cache may be performed. A read dirty representation may be cleared by a successful write operation, if desired.

A read only representation indicates that the register may not be written to. If this flag is set then a write error may not occur.

A write error (unknown state) representation of a register indicates that each time an attempt to write to a particular register results in an error.

A write dirty representation of a register indicates that the data in the write cache has not been written to the decoder yet. For example, when programming the decoders the system programs the data indicated by the write dirty. If both the write error and the write dirty representations are clear then the state is represented by the write cache. This assists in keeping track of the programming without excess overhead.

A write only representation indicates that the register may not be read from. If this flag is set then a read error may not occur.

Over time the system constructs a set of representations of the model railroad devices and the model railroad itself indicating the invalid registers, read errors, and write errors which may increases the efficiently of programing and changing the states of the model railroad. This permits the system to avoid accessing particular registers where the result will likely be an error.

The present inventor came to the realization that the valid registers of particular devices is the same for the same device of the same or different model railroads. Further, the present inventor came to the realization that a template may be developed for each particular device that may be applied to the representations of the data to predetermine the valid registers. In addition, the template may also be used to set the read error and write error, if desired. The template may include any one or more of the following representations, such as invalid, in use, read error, write only, read dirty, read only, write error, and write dirty for the possible registers of the device. The predetermination of the state of each register of a particular device avoids the time consuming activity of receiving a significant number of errors and thus constructing the caches. It is to be noted that the actual read and write cache may be any suitable type of data structure.

Figure 4:
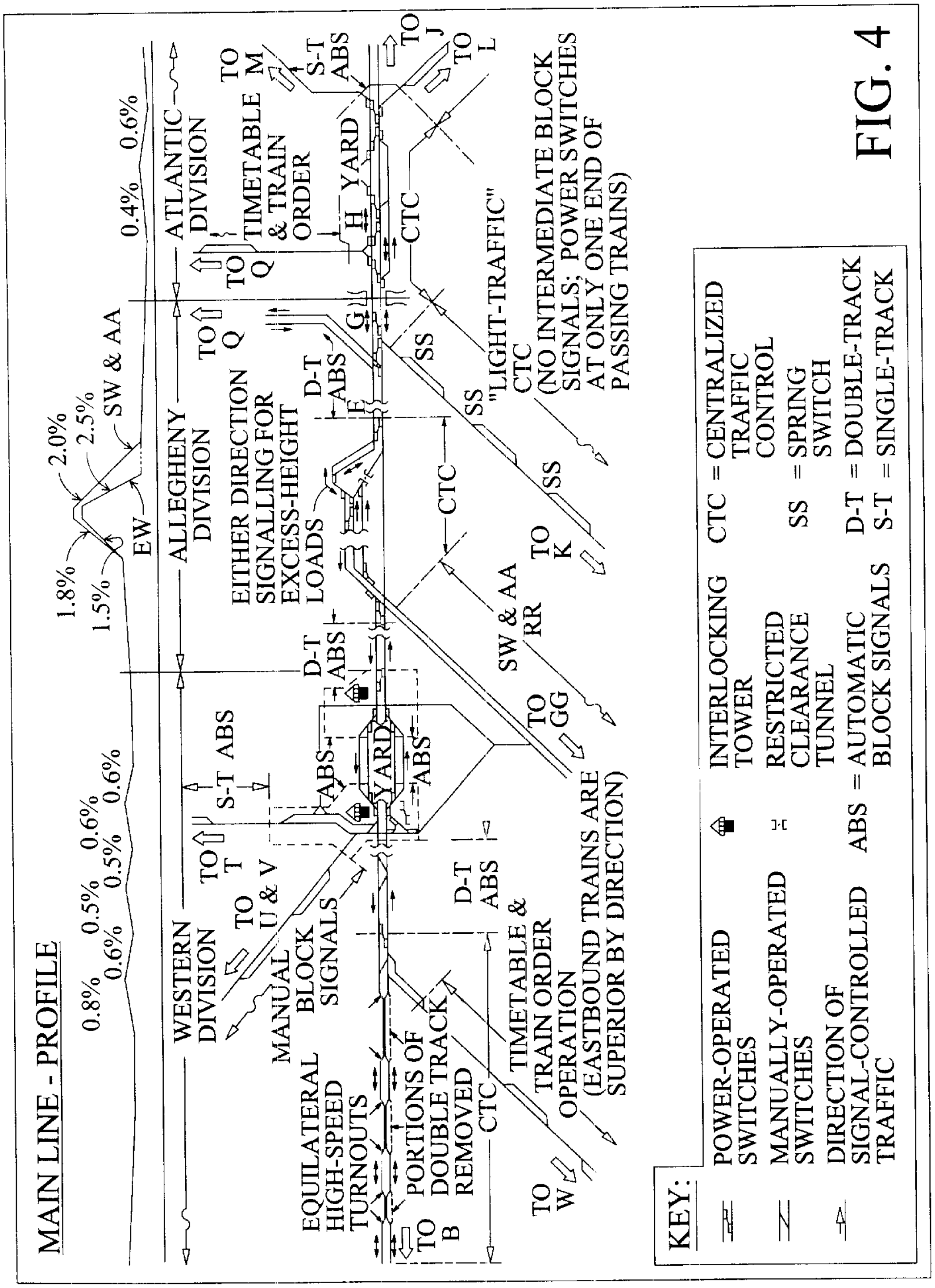
FIG. 4 is an illustration of a track and signaling arrangement.

Many model railroad systems include computer interfaces to attempt to mimic or otherwise emulate the operation of actual full-scale railroads. FIG. 4 illustrates the organization of train dispatching by "timetable and train order" (T&TO) techniques. Many of the rules governing T&TO operation are related to the superiority of trains which principally is which train will take siding at the meeting point. Any misinterpretation of these rules can be the source of either hazard or delay. For example, misinterpreting the rules may result in one train colliding with another train.

For trains following each other, T&TO operation must rely upon time spacing and flag protection to keep each train a sufficient distance apart. For example, a train may not leave a station less than five minutes after the preceding train has departed. Unfortunately, there is no assurance that such spacing will be retained as the trains move along the line, so the flagman (rear brakeman) of a train slowing down or stopping will light and throw off a five-minute red flare which may not be passed by the next train while lit. If a train has to stop, a flagman trots back along the line with a red flag or lantern a sufficient distance to protect the train, and remains there until the train is ready to move at which time he is called back to the train. A flare and two track torpedoes provide protection as the flagman scrambles back and the train resumes speed. While this type of system works, it depends upon a series of human activities.

It is perfectly possible to operate a railroad safely without signals. The purpose of signal systems is not so much to increase safety as it is to step up the efficiency and capacity of the line in handling traffic. Nevertheless, it's convenient to discuss signal system principals in terms of three types of collisions that signals are designed to prevent, namely, rear-end, side-on, and head-on.

Block signal systems prevent a train from ramming the train ahead of it by dividing the main line into segments, otherwise known as blocks, and allowing only one train in a block at a time, with block signals indicating whether or not the block ahead is occupied. In many blocks, the signals are set by a human operator. Before clearing the signal, he must verify that any train which has previously entered the block is now clear of it, a written record is kept of the status of each block, and a prescribed procedure is used in communicating with the next operator. The degree to which a block frees up operation depends on whether distant signals (as shown in FIG. 5) are provided and on the spacing of open stations, those in which an operator is on duty. If as is usually the case it is many miles to the next block station and thus trains must be equally spaced. Nevertheless, manual block does afford a high degree of safety.

The block signaling which does the most for increasing line capacity is automatic block signals (ABS), in which the signals are controlled by the trains themselves. The presence or absence of a train is determined by a track circuit. Invented by Dr. William Robinson in 1872, the track circuit's key feature is that it is fail-safe. As can be seen in FIG. 6, if the battery or any wire connection fails, or a rail is broken, the relay can't pick up, and a clear signal will not be displayed.

The track circuit is also an example of what is designated in railway signaling practice as a vital circuit, one which can give an unsafe indication if some of its components malfunction in certain ways. The track circuit is fail-safe, but it could still give a false clear indication should its relay stick in the closed or picked-up position. Vital circuit relays, therefore, are built to very stringent standards: they are large devices; rely on gravity (no springs) to drop their armature; and use special non-loading contacts which will not stick together if hit by a large surge of current (such as nearby lightning).

Figure 7B:
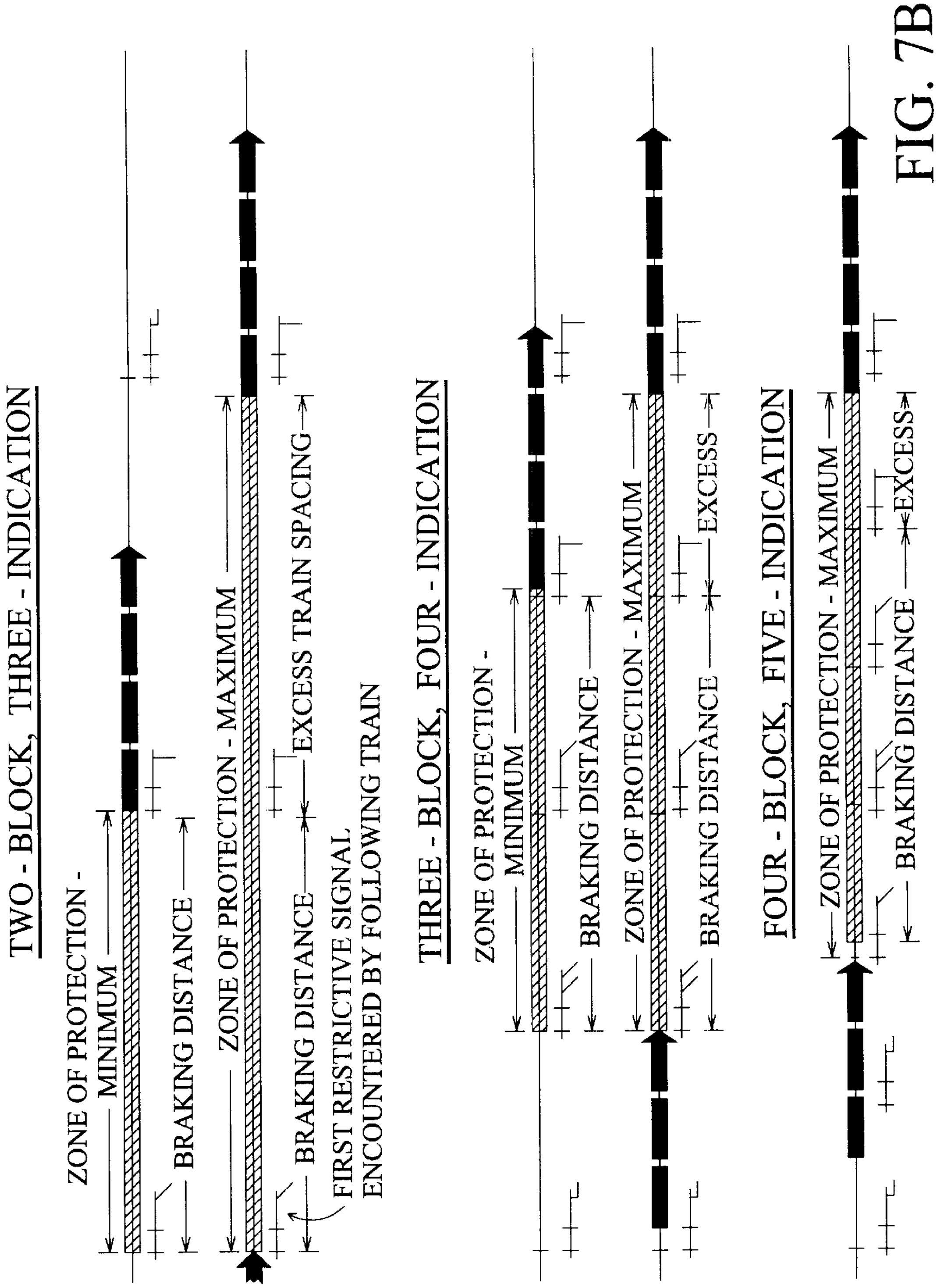

Getting a track circuit to be absolutely reliable is not a simple matter. The electrical leakage between the rails is considerable, and varies greatly with the seasons of the year and the weather. The joints and bolted-rail track are by-passed with bond wire to assure low resistance at all times, but the total resistance still varies. It is lower, for example, when cold weather shrinks the rails and they pull tightly on the track bolts or when hot weather expands to force the ends tightly together. Battery voltage is typically limited to one or two volts, requiring a fairly sensitive relay. Despite this, the direct current track circuit can be adjusted to do an excellent job and false-clears are extremely rare. The principal improvement in the basic circuit has been to use slowly-pulsed DC so that the relay drops out and must be picked up again continually when a block is unoccupied. This allows the use of a more sensitive relay which will detect a train, but additionally work in track circuits twice as long before leakage between the rails begins to threaten reliable relay operation. Referring to FIGS. 7A and 7B, the situations determining the minimum block length for the standard two-block, three-indication ABS system. Since the train may stop with its rear car just inside the rear boundary of a block, a following train will first receive warning just one block-length away. No allowance may be made for how far the signal indication may be seen by the engineer. Swivel block must be as long as the longest stopping distance for any train on the route, traveling at its maximum authorized speed.

From this standpoint, it is important to allow trains to move along without receiving any approach indications which will force them to slow down. This requires a train spacing of two block lengths, twice the stopping distance, since the signal can't clear until the train ahead is completely out of the second block. When fully loaded trains running at high speeds, with their stopping distances, block lengths must be long, and it is not possible to get enough trains over the line to produce appropriate revenue.

The three-block, four-indication signaling shown in FIG. 7 reduces the excess train spacing by 50% with warning two blocks to the rear and signal spacing need be only ½ the braking distance. In particularly congested areas such as downgrades where stopping distances are long and trains are likely to bunch up, four-block, four-indication signaling may be provided and advanced approach, approach medium, approach and stop indications give a minimum of three-block warning, allowing further block-shortening and keeps things moving.

Figure 8:
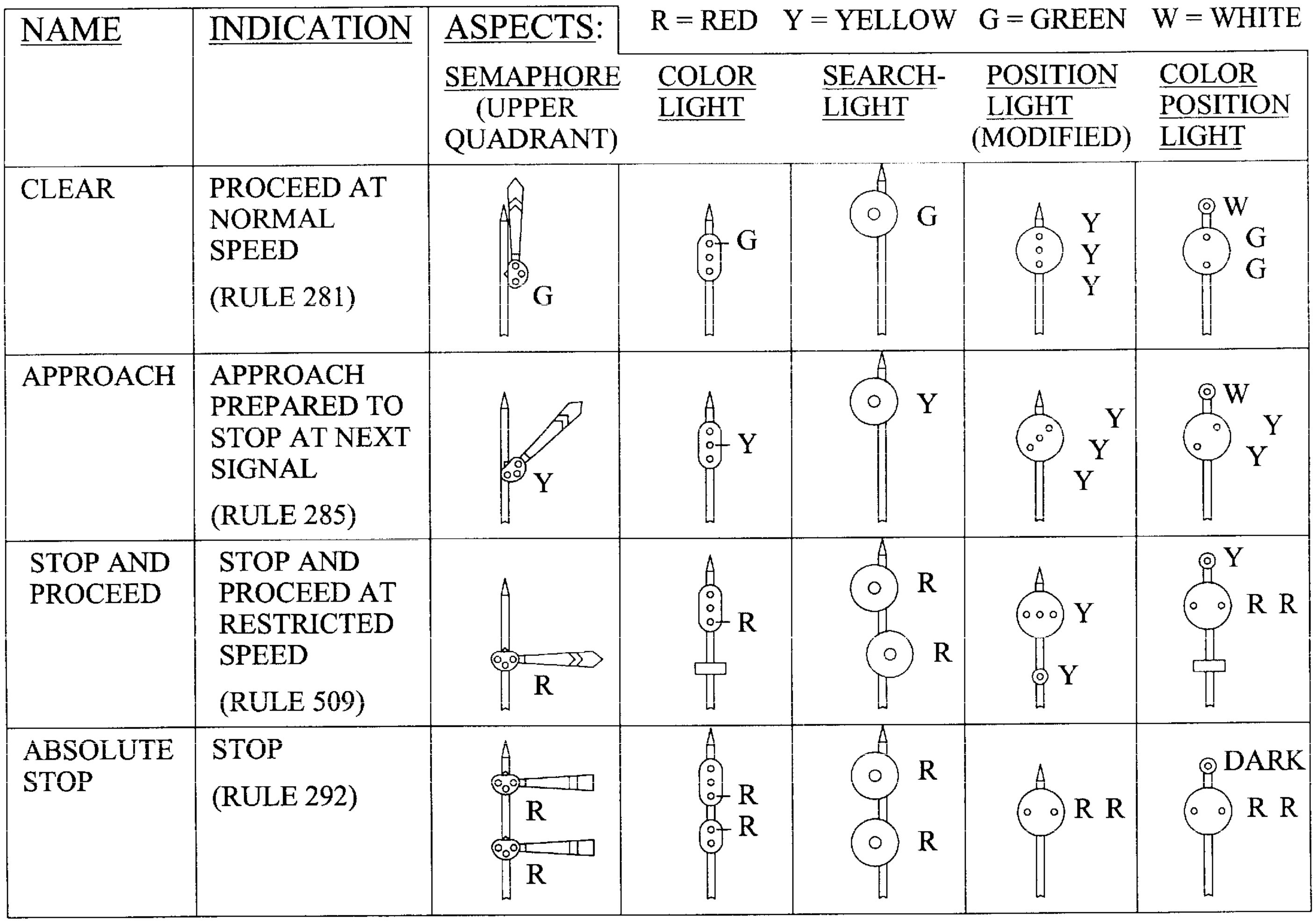
FIG. 8 is an illustration of different types of signals.

FIG. 8 uses aspects of upper quadrant semaphores to illustrate block signaling. These signals use the blade rising 90 degrees to give the clear indication.

Some of the systems that are currently developed by different railroads are shown in FIG. 8. With the general rules discussed below, a railroad is free to establish the simplest and most easily maintained system of aspects and indications that will keep traffic moving safely and meet any special requirements due to geography, traffic pattern, or equipment. Aspects such as flashing yellow for approach medium, for example, may be used to provide an extra indication without an extra signal head. This is safe because a stuck flasher will result in either a steady yellow approach or a more restrictive light-out aspect. In addition, there are provisions for interlocking so the trains may branch from one track to another.

To take care of junctions where trains are diverted from one route to another, the signals must control train speed. The train traveling straight through must be able to travel at full speed. Diverging routes will require some limit, depending on the turnout members and the track curvature, and the signals must control train speed to match. One approach is to have signals indicate which route has been set up and cleared for the train. In the American approach of speed signaling, in which the signal indicates not where the train is going but rather what speed is allowed through the interlocking. If this is less than normal speed, distant signals must also give warning so the train can be brought down to the speed in-time. FIGS. 9A and 9B show typical signal aspects and indications as they would appear to an engineer. Once a route is established and the signal cleared, route locking is used to insure that nothing can be changed to reduce the route's speed capability from the time the train approaching it is admitted to enter until it has cleared the last switch. Additional refinements to the basic system to speed up handling trains in rapid sequence include sectional route locking which unlocks portions of the route as soon as the train has cleared so that other routes can be set up promptly. Interlocking signals also function as block signals to provide rear-end protection. In addition, at isolated crossings at grade, an automatic interlocking can respond to the approach of a train by clearing the route if there are no opposing movements cleared or in progress. Automatic interlocking returns everything to stop after the train has passed. As can be observed, the movement of multiple trains among the track potentially involves a series of interconnected activities and decisions which must be performed by a controller, such as a dispatcher. In essence, for a railroad the dispatcher controls the operation of the trains and permissions may be set by computer control, thereby controlling the railroad. Unfortunately, if the dispatcher fails to obey the rules as put in place, traffic collisions may occur.

In the context of a model railroad the controller is operating a model railroad layout including an extensive amount of track, several locomotives (trains), and additional functionality such as switches. The movement of different objects, such as locomotives and entire trains, may be monitored by a set of sensors. The operator issues control commands from his computer console, such as in the form of permissions and class warrants for the time and track used. In the existing monolithic computer systems for model railroads a single operator from a single terminal-may control the system effectively. Unfortunately, the present inventor has observed that in a multi-user environment where several clients are attempting to simultaneously control the same model railroad layout using their terminals, collisions periodically nevertheless occur. In addition, significant delay is observed between the issuance of a command and its eventual execution. The present inventor has determined that unlike full scale railroads where the track is controlled by a single dispatcher, the use of multiple dispatchers each having a different dispatcher console may result in conflicting information being sent to the railroad layout. In essence, the system is designed as a computer control system to implement commands but in no manner can the dispatcher consoles control the actions of users. For example, a user input may command that an event occur resulting in a crash. In addition, a user may override the block permissions or class warrants for the time and track used thereby causing a collision. In addition, two users may inadvertently send conflicting commands to the same or different trains thereby causing a collision. In such a system, each user is not aware of the intent and actions of other users aside from any feedback that may be displayed on their terminal. Unfortunately, the feedback to their dispatcher console may be delayed as the execution of commands issued by one or more users may take several seconds to several minutes to be executed.

One potential solution to the dilemma of managing several users' attempt to simultaneously control a single model railroad layout is to develop a software program that is operating on the server which observes what is occurring. In the event that the software program determines that a collision is imminent, a stop command is issued to the train overriding all other commands to avoid such a collision. However, once the collision is avoided the user may, if desired, override such a command thereby restarting the train and causing a collision. Accordingly, a software program that merely oversees the operation of track apart from the validation of commands to avoid imminent collisions is not a suitable solution for operating a model railroad in a multi-user distributed environment. The present inventor determined that prior validation is important because of the delay in executing commands on the model railroad and the potential for conflicting commands. In addition, a hardware throttle directly connected to the model railroad layout may override all such computer based commands thereby resulting in the collision. Also, this implementation provides a suitable security model to use for validation of user actions.

Figure 10:
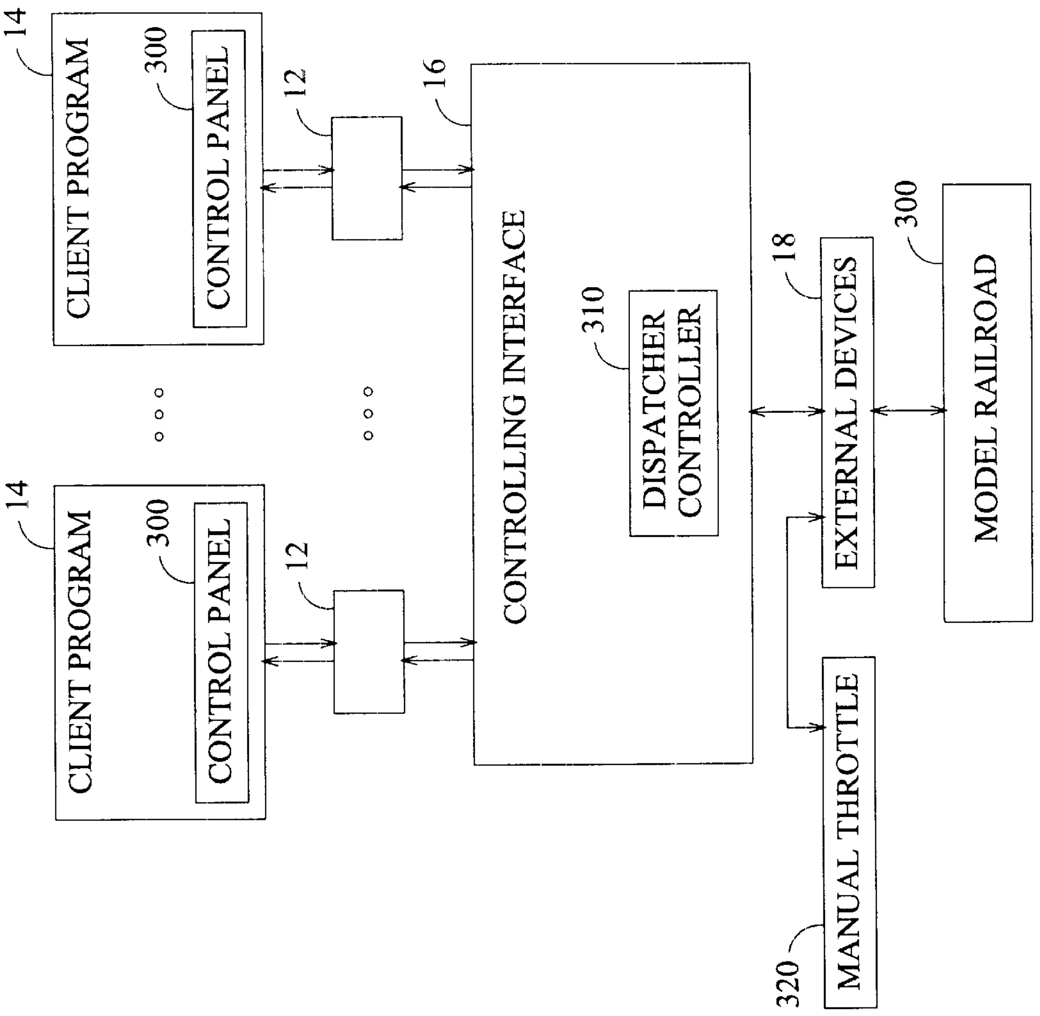
FIG. 10 is a further embodiment of the system including a dispatcher.

Referring to FIG. 10, the client program 14 preferably includes a control panel 300 which provides a graphical interface (such as a personal computer with software thereon or a dedicated hardware source) for computerized control of the model railroad 302. The graphical interface may take the form of those illustrated in FIGS. 5–9, or any other suitable command interface to provide control commands to the model railroad 302. Commands are issued by the client program 14 to the controlling interface using the control panel 300. The commands are received from the different client programs 14 by the controlling interface 16. The commands control the operation of the model railroad 302, such as switches, direction, and locomotive throttle. Of particular importance is the throttle which is a state which persists for an indefinite period of time, potentially resulting in collisions if not accurately monitored. The controlling interface 16 accepts all of the commands and provides an acknowledgment to free up the communications transport for subsequent commands. The acknowledgment may take the form of a response indicating that the command was executed thereby updating the control panel 300. The response may be subject to updating if more data becomes available indicating the previous response is incorrect. In fact, the command may have yet to be executed or verified by the controlling interface 16. After a command is received by the controlling interface 16, the controlling interface 16 passes the command (in a modified manner, if desired) to a dispatcher controller 310. The dispatcher controller 310 includes a rule-based processor together with the layout of the railroad 302 and the status of objects thereon. The objects may include properties such as speed, location, direction, length of the train, etc. The dispatcher controller 310 processes each received command to determine if the execution of such a command would violate any of the rules together with the layout and status of objects thereon. If the command received is within the rules, then the command may be passed to the model railroad 302 for execution. If the received command violates the rules, then the command may be rejected and an appropriate response is provided to update the clients display. If desired, the invalid command may be modified in a suitable manner and still be provided to the model railroad 302. In addition, if the dispatcher controller 310 determines that an event should occur, such as stopping a model locomotive, it may issue the command and update the control panels 300 accordingly. If necessary, an update command is provided to the client program 14 to show the update that occurred.

The "asynchronous" receipt of commands together with a "synchronous" manner of validation and execution of commands from the multiple control panels 300 permits a simplified dispatcher controller 310 to be used together with a minimization of computer resources, such as com ports. In essence, commands are managed independently from the client program 14. Likewise, a centralized dispatcher controller 310 working in an "off-line" mode increases the likelihood that a series of commands that are executed will not be conflicting resulting in an error. This permits multiple model railroad enthusiasts to control the same model railroad in a safe and efficient manner. Such concerns regarding the interrelationships between multiple dispatchers does not occur in a dedicated non-distributed environment. When the command is received or validated all of the control panels 300 of the client programs 14 may likewise be updated to reflect the change. Alternatively, the controlling interface 16 may accept the command, validate it quickly by the dispatcher controller, and provide an acknowledgment to the client program 14. In this manner, the client program 14 will not require updating if the command is not valid. In a likewise manner, when a command is valid the control panel 300 of all client programs 14 should be updated to show the status of the model railroad 302.

A manual throttle 320 may likewise provide control over devices, such as the locomotive, on the model railroad 302. The commands issued by the manual throttle 320 may be passed first to the dispatcher controller 310 for validation in a similar manner to that of the client programs 14. Alternatively, commands from the manual throttle 320 may be directly passed to the model railroad 302 without first being validated by the dispatcher controller 302. After execution of commands by the external devices 18, a response will be provided to the controlling interface 16 which in response may check the suitability of the command, if desired. If the command violates the layout rules then a suitable correctional command is issued to the model railroad 302. If the command is valid then no correctional command is necessary. In either case, the status of the model railroad 302 is passed to the client programs 14 (control panels 300).

As it can be observed, the event driven dispatcher controller 310 maintains the current status of the model railroad 302 so that accurate validation may be performed to minimize conflicting and potentially damaging commands. Depending on the particular implementation, the control panel 300 is updated in a suitable manner, but in most cases, the communication transport 12 is freed up prior to execution of the command by the model railroad 302.

The computer dispatcher may also be distributed across the network, if desired. In addition, the computer architecture described herein supports different computer interfaces at the client program 14.

The terms and. expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of operating a digitally controlled model railroad comprising the steps of:

(a) transmitting a first command from a first client program to a resident external controlling interface through a first communications transport;

(b) transmitting a second command from a second client program to said resident external controlling interface through a second communications transport;

(c) receiving said first command and said second command at said resident external controlling interface;

(d) said resident external controlling interface queuing said first and second commands;

(e) validating said first and second commands against permissible actions regarding the interaction between a plurality of objects of said model railroad; and (f) said resident external controlling interface sending third and fourth commands representative of said first and second commands, respectively, to a digital command station, each of which upon successful validation of step (e), for execution on said digitally controlled model railroad.

2. The method of claim 1, further comprising the steps of:

(a) providing an acknowledgement to said first client program in response to receiving said first command by said resident external controlling interface that said first command was successfully validated prior to validating said first command; and (b) providing an acknowledgement to said second client program in response to receiving said second command by said resident external controlling interface that said second command was successfully validated prior to validating said second command.

3. The method of claim 1, further comprising the steps of:

(a) selectively sending said third command to one of a plurality of digital command stations; and (b) selectively sending said fourth command to one of said plurality of digital command stations.

4. The method of claim 1, further comprising the step of receiving command station responses representative of the state of said digitally controlled model railroad from said digital command station and validating said responses regarding said interaction.

5. The method of claim wherein said first and second commands relate to the speed of locomotives.

6. The method of claim 2, further comprising the step of updating said successful validation to at least one of said first and second client programs of at least one of said first and second commands with an indication that at least one of said first and second commands was unsuccessfully validated.

7. The method of claim 1, further comprising the step of updating a database of the state of said digitally controlled model railroad based upon said receiving command station responses representative of said state of said digitally controlled model railroad.

8. The method of claim 7 wherein said validation is performed by an event driven dispatcher.

9. The method of claim 7 wherein said first command and said third command are the same command, and said second command and said fourth command are the same command.

10. A method of operating a digitally controlled model railroad comprising the steps of:

(a) transmitting a first command from a first client program to a resident external controlling interface through a first communications transport;

(b) receiving said first command at said resident external controlling interface;

(c) validating said first command against permissible actions regarding the interaction between a plurality of objects of said model railroad; and (d) said resident external controlling interface selectively sending a second command representative of said first command to one of a plurality of digital command stations for execution on said digitally controlled model railroad based upon information contained within at least one of said first and second commands.

11. The method of claim 10, further comprising the steps of:

(a) transmitting a third command from a second client program to said resident external controlling interface through a second communications transport;

(b) receiving said third command at said resident external controlling interface;

(c) validating said third command against permissible actions regarding the interaction between a plurality of objects of said model railroad; and (d) said resident external controlling interface selectively sending a fourth command representative of said third command to one of said plurality of digital command stations for execution on said digitally controlled model railroad based upon information contained within at least one of said third and fourth commands.

12. The method of claim 11 wherein said first communications transport is at least one of a COM interface and a DCOM interface.

13. The method of claim 11 wherein said first communications transport and said second communications transport are DCOM interfaces.

14. The method of claim 10 wherein said first client program and said resident external controlling interface are operating on the same computer.

15. The method of claim 11 wherein said first client program, said second client program, and said resident external controlling interface are all operating on different computers.

16. The method of claim 10, further comprising the step of providing an acknowledgement to said first client program in response to receiving said first command by said resident external controlling interface prior to validating said first command.

17. The method of claim 10, further comprising the step of receiving command station responses representative of the state of said digitally controlled model railroad from said of digital command station and validating said responses regarding said interaction.

18. The method of claim 17, further comprising the step of comparing said command station responses to previous commands sent to said digital command station to determine which said previous commands it corresponds with.

19. The method of claim 10, further comprising the step of updating validation of said first command based on data received from said digital command stations.

20. The method of claim 19, further comprising the step of updating a database of the state of said digitally controlled model railroad based upon command station responses representative of said state of said digitally controlled model railroad.

21. The method of claim 20, further comprising the step of updating said successful validation to said first client program in response to receiving said first command by said resident external controlling interface together with state information from said database related to said first command.

22. The method of claim 10 wherein said resident external controlling interface communicates in an asynchronous manner with said first client program while communicating in a synchronous manner with said plurality of digital command stations.

23. A method of operating a digitally controlled model railroad comprising the steps of:

(a) transmitting a first command from a first client program to a resident external controlling interface through a first communications transport;

(b) transmitting a second command from a second client program to a resident external controlling interface through a second communications transport;

(c) receiving said first command at said resident external controlling interface;

(d) receiving said second command at said resident external controlling interface;

(e) validating said first and second commands against permissible actions regarding the interaction between a plurality of objects of said model railroad; and (f) said resident external controlling interface sending a third and fourth command representative of said first command and said second command, respectively, to the same digital command station for execution on said digitally controlled model railroad.

24. The method of claim 23 wherein said resident external controlling interface communicates in an asynchronous manner with said first and second client programs while communicating in a synchronous manner with said digital command station.

25. The method of claim 23 wherein said first communications transport is at least one of a COM interface and a DCOM interface.

26. The method of claim 23 wherein said first communications transport and said second communications transport are DCOM interfaces.

27. The method of claim 23 wherein said first client program and said resident external controlling interface are operating on the same computer.

28. The method of claim 23 wherein said first client program, said second client program, and said resident external controlling interface are all operating on different computers.

29. The method of claim 23, further comprising the step of providing an acknowledgement to said first client program in response to receiving said first command by said resident external controlling interface that said first command was successfully validated prior to validating said first command.

30. The method of claim 29, further comprising the step of receiving command station responses representative of the state of said digitally controlled model railroad from said of digital command station.

31. The method of claim 30, further comprising the step of comparing said command station responses to previous commands sent to said digital command station to determine which said previous commands it corresponds with.

32. The method of claim 31, further comprising the step of updating a database of the state of said digitally controlled model railroad based upon said receiving command station responses representative of said state of said digitally controlled model railroad.

33. The method of claim 32, further comprising the step of updating said successful validation to said first client program in response to receiving said first command by said resident external controlling interface together with state information from said database related to said first command.

34. The method of claim 23 wherein said validation is performed by an event driven dispatcher.

35. A method of operating a digitally controlled model railroad comprising the steps of:

(a) transmitting a first command from a first client program to a first processor through a first communications transport;

(b) receiving said first command at said first processor; and (c) said first processor providing an acknowledgement to said first client program through said first communications transport indicating that said first command has been validated against permissible actions regarding the interaction between a plurality of objects of said model railroad and properly executed prior to execution of commands related to said first command by said digitally controlled model railroad.

36. The method of claim 35, further comprising the step of sending said first command to a second processor which processes said first command into a state suitable for a digital command station for execution on said digitally controlled model railroad.

37. The method of claim 36, further comprising the step of said second process queuing a plurality of commands received.

38. The method of claim 35, further comprising the steps of:

(a) transmitting a second command from a second client program to said first processor through a second communications transport;

(b) receiving said second command at said first processor; and (c) said first processor selectively providing an acknowledgement to said second client program through said second communications transport indicating that said second command has been validated against permissible actions regarding the interaction between a plurality of objects of said model railroad and properly executed prior to execution of commands related to said second command by said digitally controlled model railroad.

39. The method of claim 38, further comprising the steps of:

(a) sending a third command representative of said first command to one of a plurality of digital command stations for execution on said digitally controlled model railroad based upon information contained within at least one of said first and third commands; and (b) sending a fourth command representative of said second command to one of said plurality of digital command stations for execution on said digitally controlled model railroad based upon information contained within at least one of said second and fourth commands.

40. The method of claim 35 wherein said first communications transport is at least one of a COM interface and a DCOM interface.

41. The method of claim 38 wherein said first communications transport and said second communications transport are DCOM interfaces.

42. The method of claim 35 wherein said first client program and said first processor are operating on the same computer.

43. The method of claim 38 wherein said first client program, said second client program, and said first processor are all operating on different computers.

44. The method of claim 35 further comprising the step of receiving command station responses representative of the state of said digitally controlled model railroad from said of digital command station.

45. The method of claim 35, further comprising the step of updating a database of the state of said digitally controlled model railroad based upon said receiving command station responses representative of said state of said digitally controlled model railroad.

46. The method of claim 45, further comprising the step of updating said successful validation to said first client program in response to receiving said first command by first processor together with state information from said database related to said first command.

47. The method of claim 43 wherein said first processor communicates in an asynchronous manner with said first client program while communicating in a synchronous manner with said plurality of digital command stations.

* * * * *

UNITED STATES PATENT AND TRADEMARK OFFICE

CERTIFICATE OF CORRECTION

PATENT NO. : 6,676,089 B1
DATED : January 13, 2004
INVENTOR(S) : Katzer

It is certified that error appears in the above-identified patent and that said Letters Patent is hereby corrected as shown below:

Column 2,
Line 38, change “resistant external” to read -- resident external --;

Column 5,
Line 2, change “System’” to read -- Systems’ --;

Column 6,
Line 50, change “cue” to read -- queue --;

Column 13,
Line 21, change “he” to read -- the --;

Column 15,
Line 2, change “manufacture” to read -- manufacturer --;
Line 40, change “our” to -- out --;

Column 17,
Line 73, change “you” to read -- your --;

Column 19,
Line 54, change “Disconenct” to read -- Disconnect --;

Column 21,
Line 59, after “node” insert a period;

Column 61,
Line 51, change “Descriptioni” to read -- Description --;

Column 69,
Line 10, change “programable” to read -- programmable --;

Column 71,
Line 53, change “efficiently” to read -- efficiency --;

Column 74,
Line 16, change “in-time” to read -- in time --;
Line 49, change “terminal-may” to read -- terminal may --;

UNITED STATES PATENT AND TRADEMARK OFFICE
CERTIFICATE OF CORRECTION

PATENT NO. : 6,676,089 B1
DATED : January 13, 2004
INVENTOR(S) : Matthew A. Katzer It is certified that error appears in the above-identified patent and that said Letters Patent is hereby corrected as shown below:

Column 76,
Line 41, after "controller" delete "302" and insert -- 310 --;
Line 63, after "and" delete the period;

Column 77,
Line 46, after "claim" insert -- 1 --.

Signed and Sealed this

Twenty-seventh Day of September, 2005

JON W. DUDAS
*Director of the United States Patent and Trademark Office*